(12) United States Patent
Hori

(10) Patent No.: US 12,517,336 B2
(45) Date of Patent: Jan. 6, 2026

(54) ZOOM LENS AND IMAGE PICKUP APPARATUS

(71) Applicant: CANON KABUSHIKI KAISHA, Tokyo (JP)

(72) Inventor: Masao Hori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 268 days.

(21) Appl. No.: 18/336,076

(22) Filed: Jun. 16, 2023

(65) Prior Publication Data

US 2024/0004172 A1 Jan. 4, 2024

(30) Foreign Application Priority Data

Jul. 4, 2022 (JP) ................... 2022-107874

(51) Int. Cl.
*G02B 15/14* (2006.01)
*G02B 13/18* (2006.01)

(52) U.S. Cl.
CPC ......... *G02B 15/1461* (2019.08); *G02B 13/18* (2013.01); *G02B 15/144113* (2019.08)

(58) Field of Classification Search
CPC .............. G02B 15/1461; G02B 13/18; G02B 15/144113; G02B 15/14; G02B 13/009; G02B 15/00; G02B 15/142; G02B 15/1421; G02B 15/143; G02B 15/1431; G02B 15/143105; G02B 15/06; G02B 15/08; G02B 15/144–144515; G02B 15/145–145531; G02B 15/146–1465
USPC ................... 359/676–695, 745–795
See application file for complete search history.

(56) References Cited

U.S. PATENT DOCUMENTS

| | | | |
|---|---|---|---|
| 10,359,604 | B2 | 7/2019 | Hori |
| 10,955,647 | B2 | 3/2021 | Ogawa |
| 11,137,586 | B2 | 10/2021 | Shimomura |
| 11,143,850 | B2 | 10/2021 | Hori |
| 11,347,034 | B2 | 5/2022 | Hori |

(Continued)

FOREIGN PATENT DOCUMENTS

| | | |
|---|---|---|
| JP | 2016-095448 A | 5/2016 |
| JP | 2021-076780 A | 5/2021 |

OTHER PUBLICATIONS

"Ohara GmbH", Ohara optical glass, Jun. 2017.*

*Primary Examiner* — Marin Pichler
*Assistant Examiner* — Kuei-Jen L Edenfield
(74) *Attorney, Agent, or Firm* — Carter, DeLuca & Farrell LLP

(57) ABSTRACT

A zoom lens including in order from object side to image side: a first lens unit having a positive refractive power that does not move for zooming; movable lens units including a lens unit having a negative refractive power; and a rear lens unit having a positive refractive power that does not move for zooming, in which an interval between lens units adjacent to each other changes for zooming, in which focal lengths of the zoom lens when focused on an infinity object at the wide angle end and at the telephoto end, a focal length of the first lens unit, and an F-number at maximum aperture of the zoom lens at the wide angle end are appropriately set, in which the rear lens unit includes a plurality of negative lenses formed of a material whose refractive index with respect to d-line and first partial dispersion ratio are appropriately set.

10 Claims, 17 Drawing Sheets

(56) References Cited

U.S. PATENT DOCUMENTS

| | | | | |
|---|---|---|---|---|
| 2010/0085647 | A1* | 4/2010 | Nurishi | G02B 15/144113 |
| | | | | 359/687 |
| 2015/0062718 | A1* | 3/2015 | Ohashi | G02B 27/4211 |
| | | | | 359/688 |
| 2017/0108677 | A1* | 4/2017 | Shimomura | G02B 15/20 |
| 2018/0188510 | A1* | 7/2018 | Yonezawa | G02B 15/177 |
| 2020/0348495 | A1* | 11/2020 | Sudo | G02B 15/20 |
| 2020/0348496 | A1* | 11/2020 | Eguchi | G02B 13/009 |
| 2021/0048654 | A1* | 2/2021 | Ogawa | G02B 15/145125 |
| 2021/0109330 | A1 | 4/2021 | Hori | |
| 2022/0269057 | A1 | 8/2022 | Hori | |

* cited by examiner

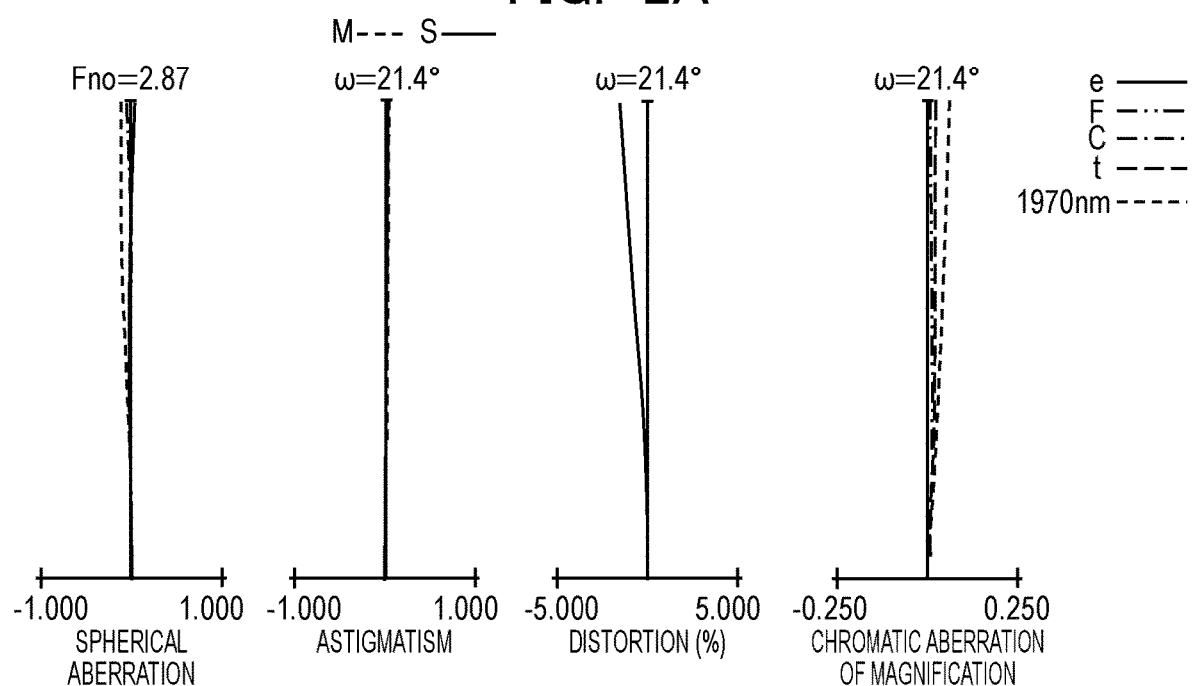
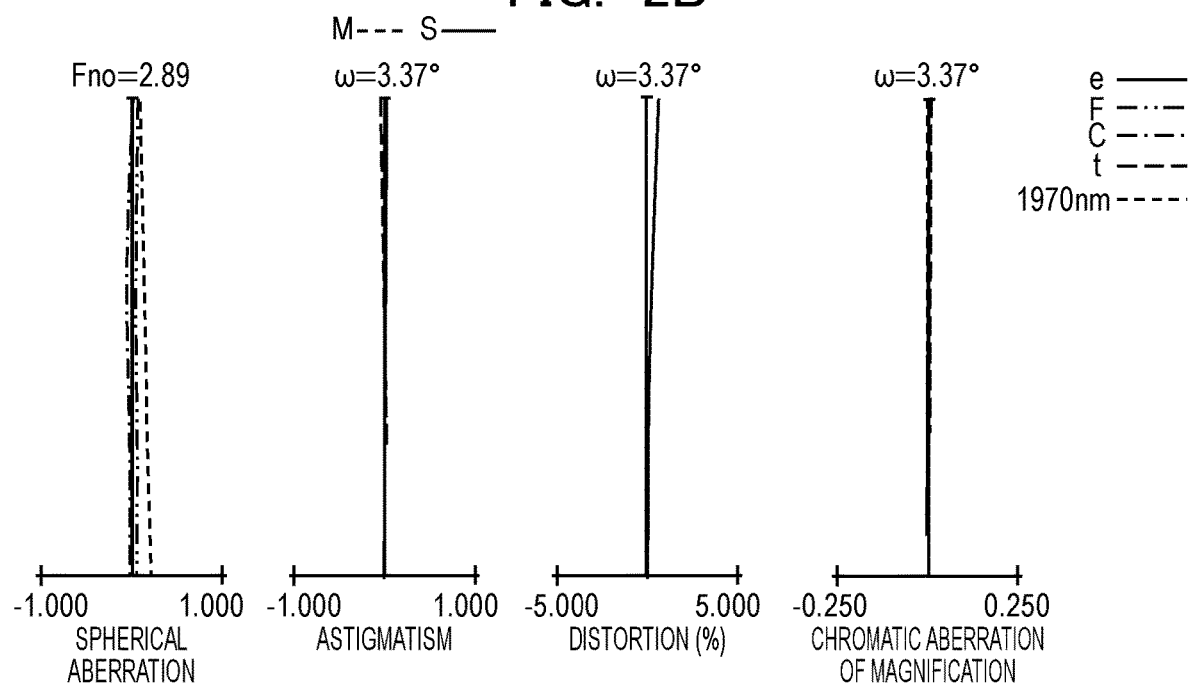

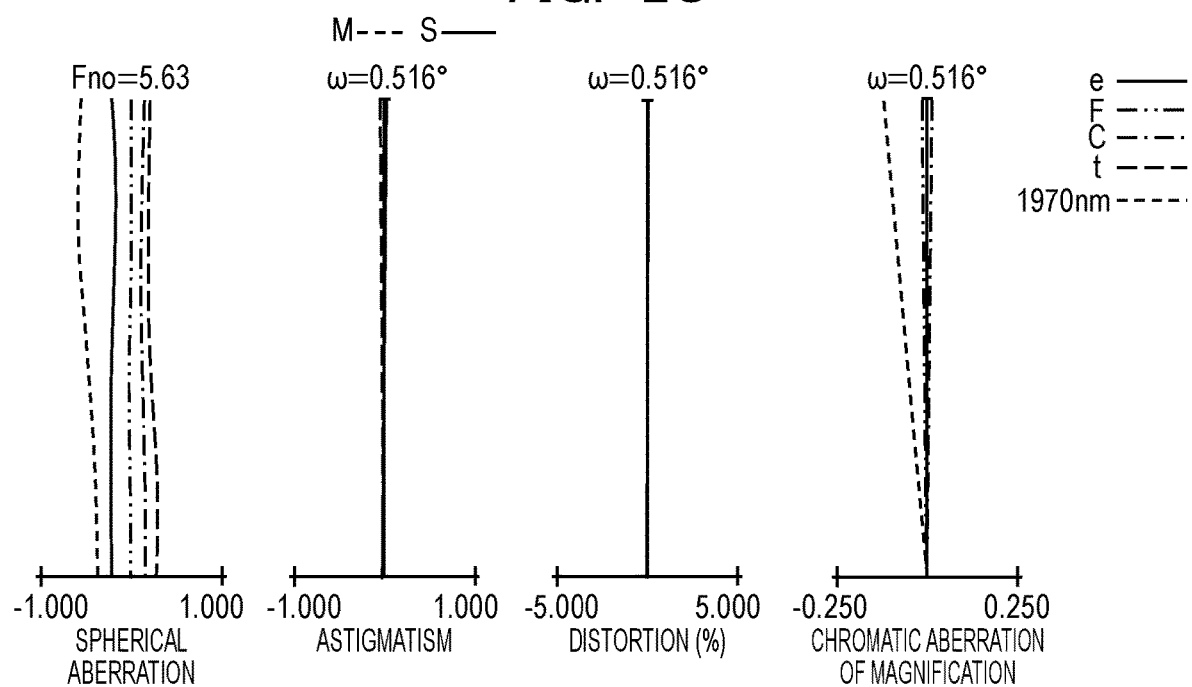

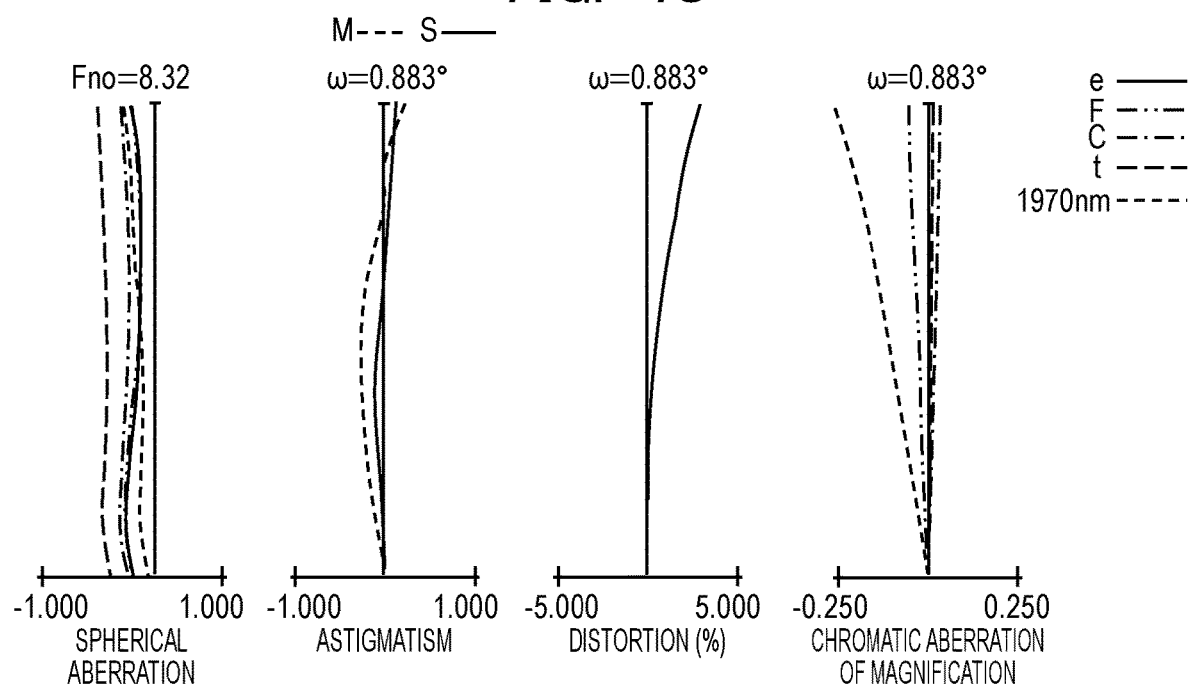

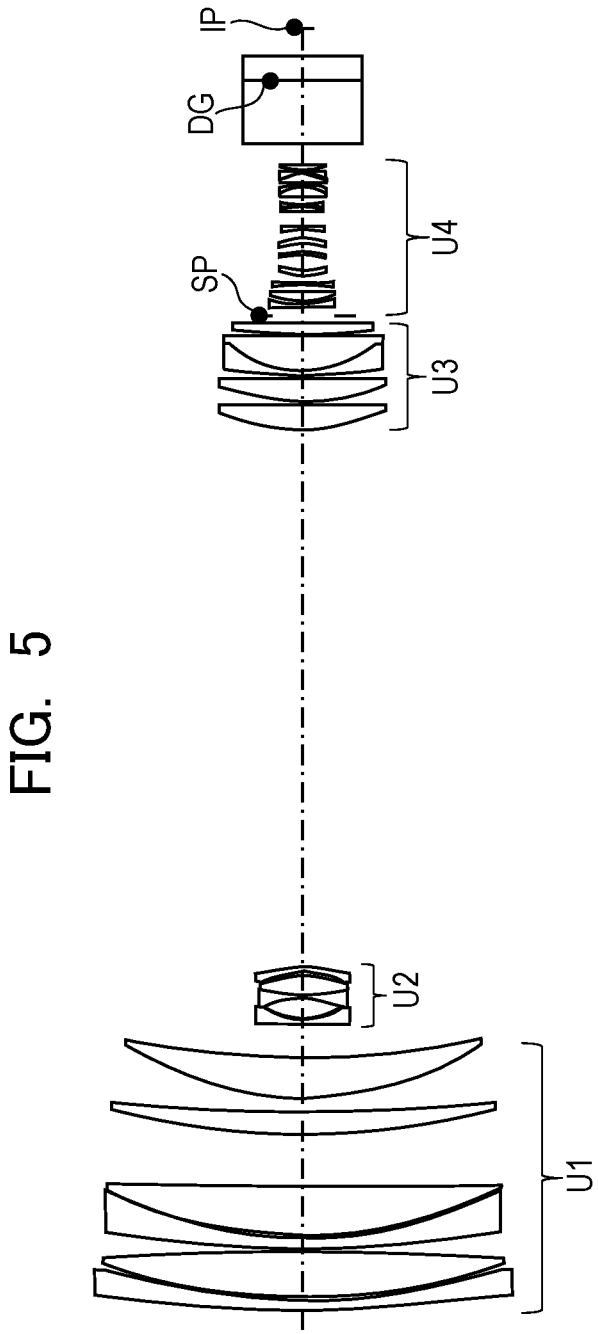

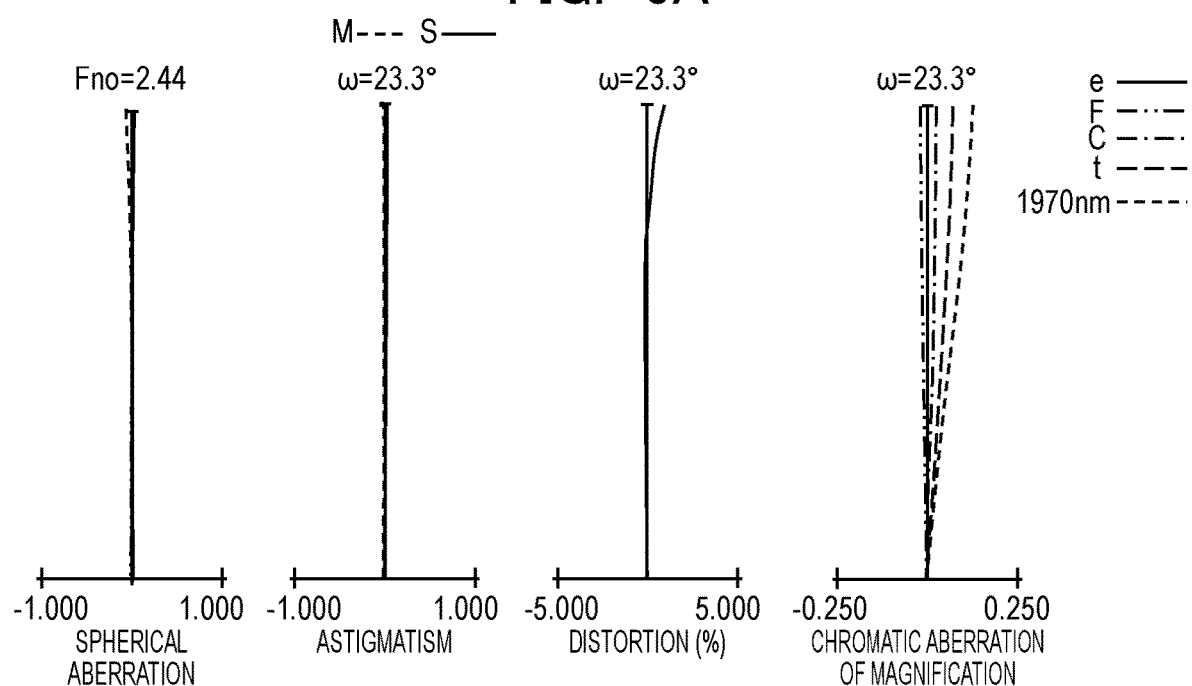
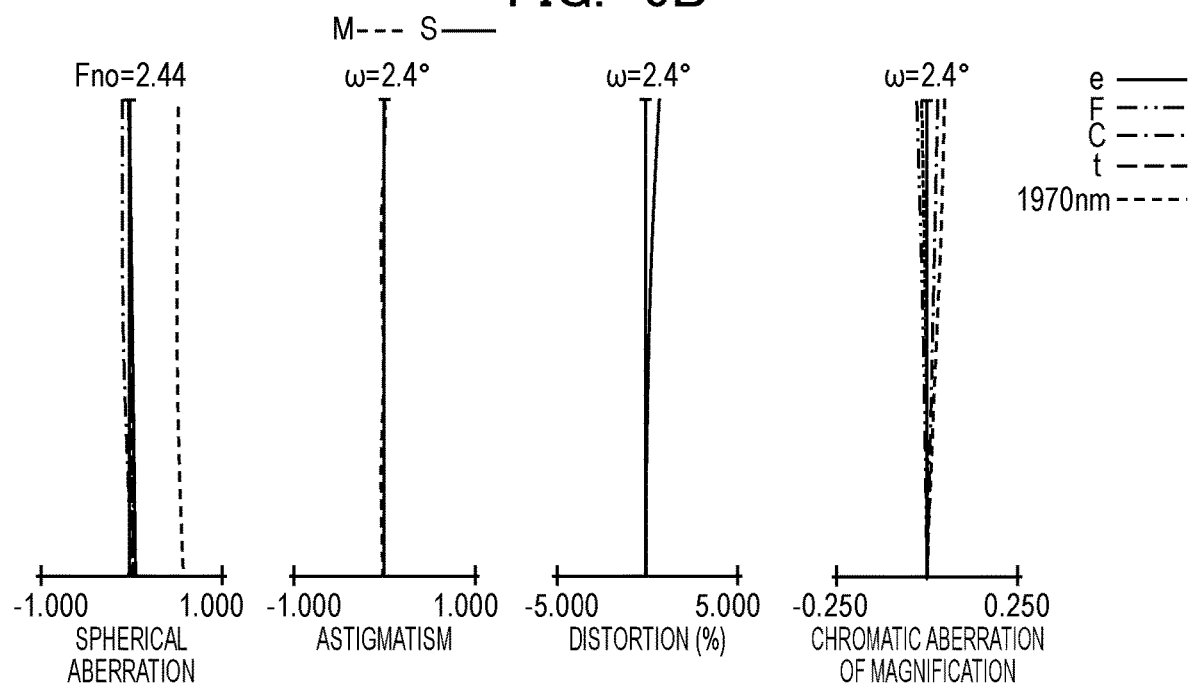

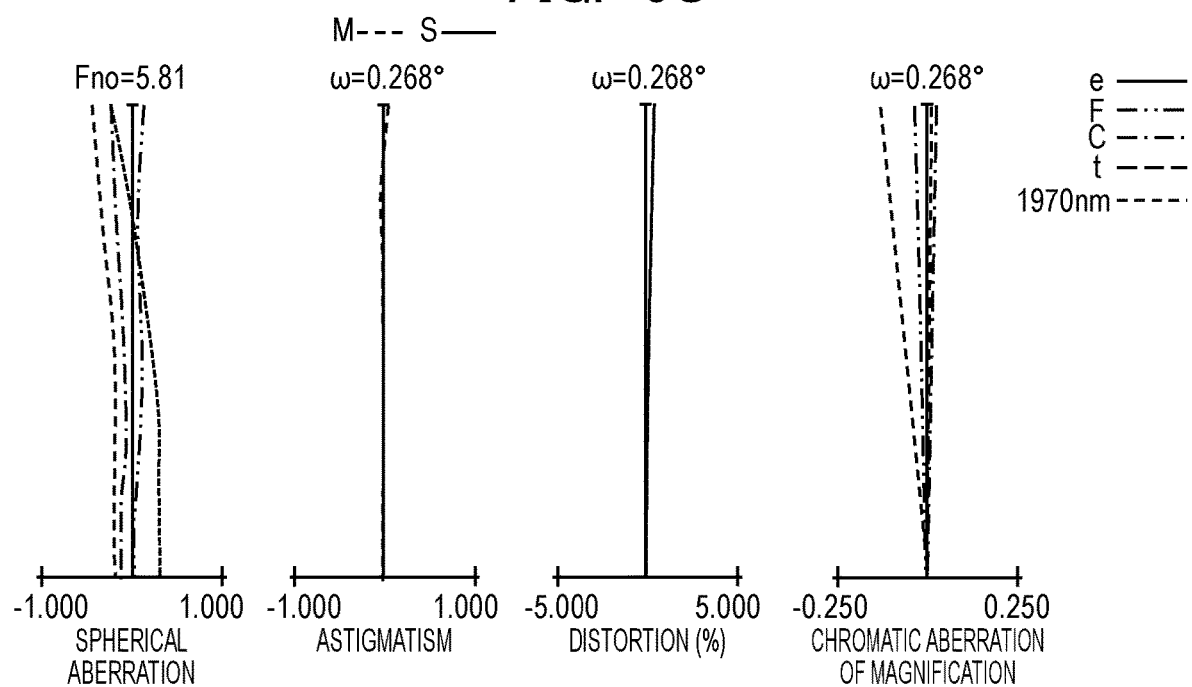

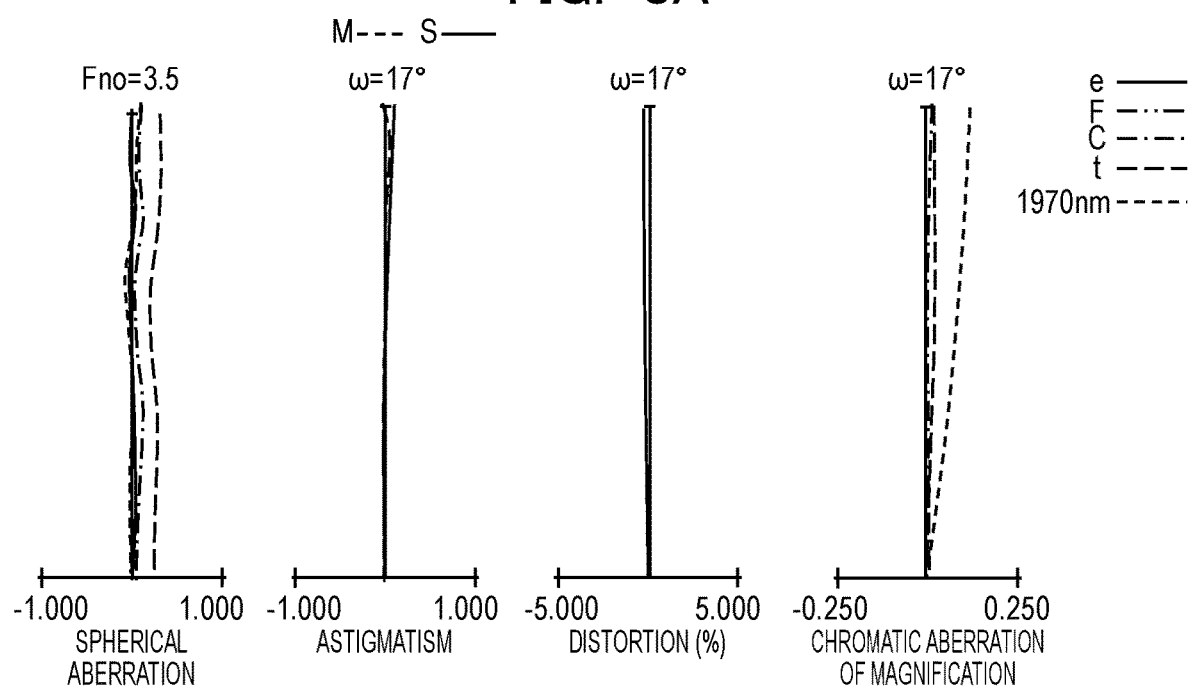
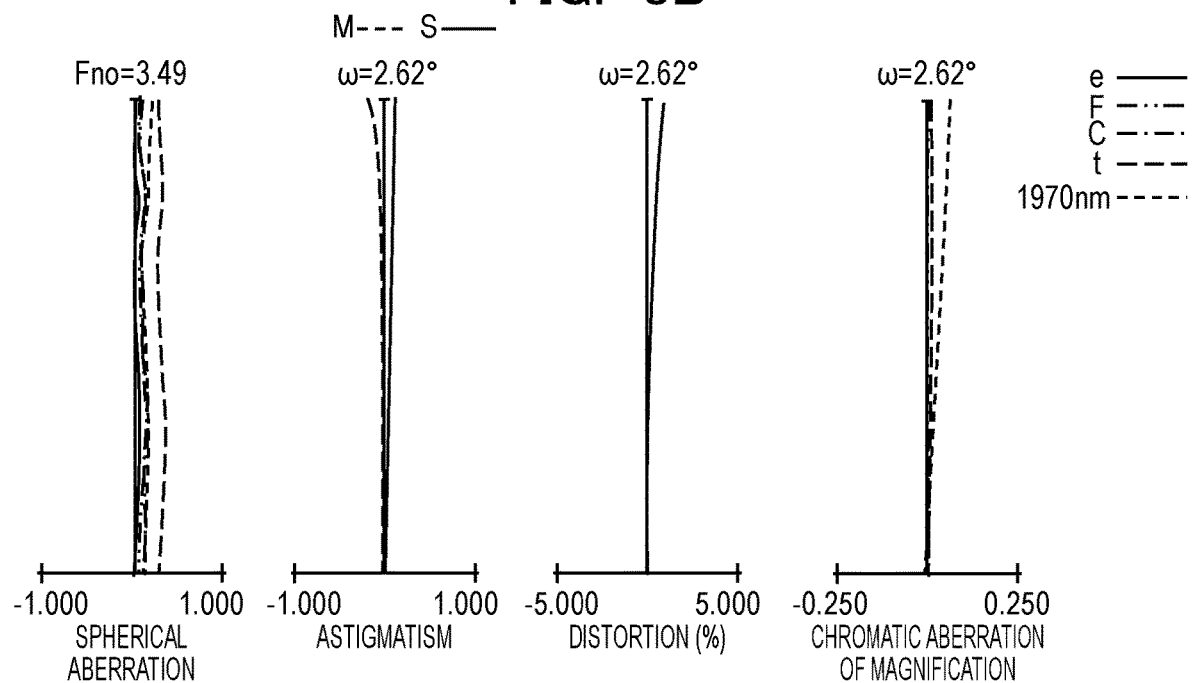

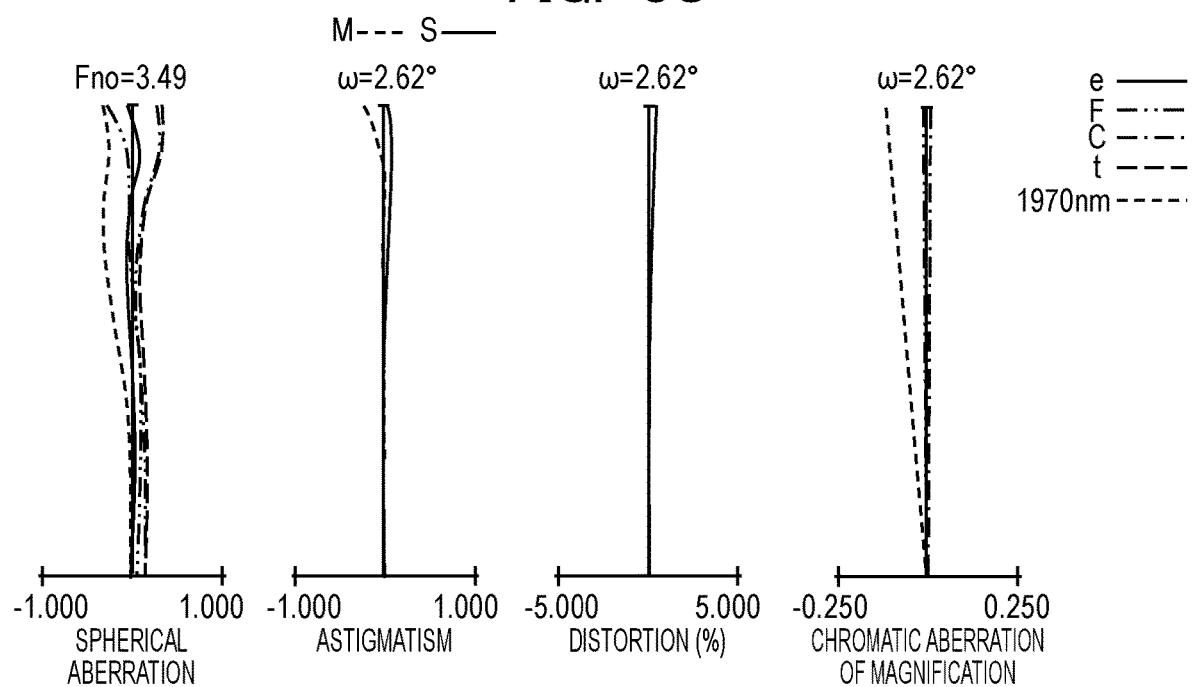

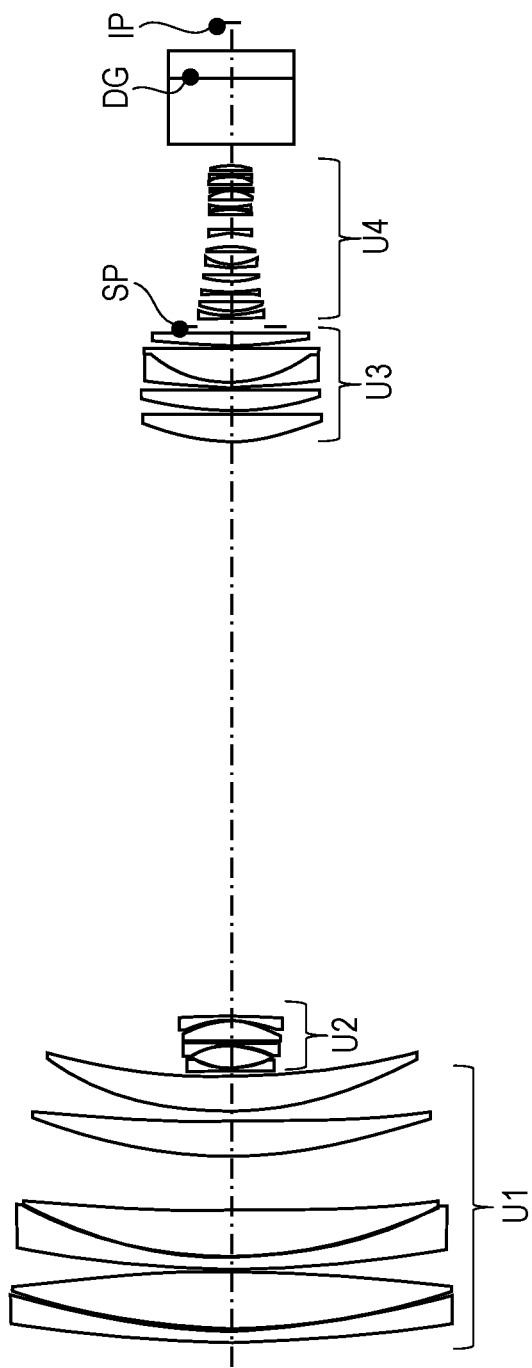

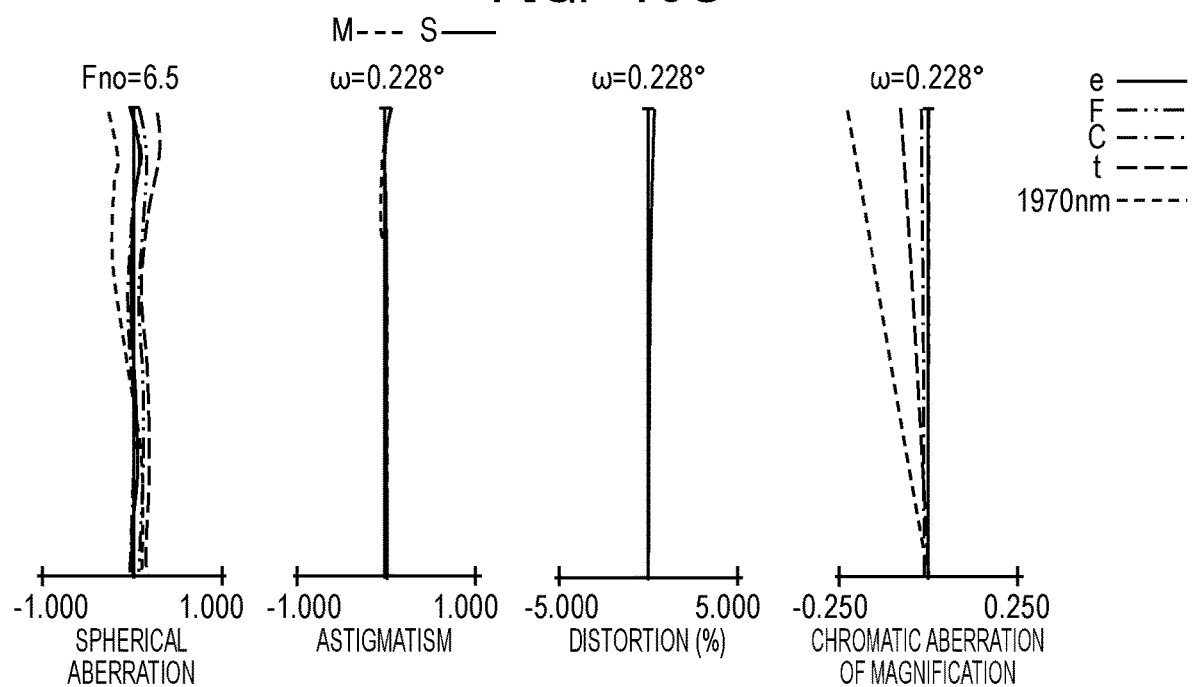

ZOOM LENS AND IMAGE PICKUP APPARATUS

BACKGROUND OF THE INVENTION

Field of the Invention

The present invention relates to a zoom lens and an image pickup apparatus.

Description of the Related Art

There is a demand for a zoom lens having a high zoom ratio and high optical performance in an image pickup apparatus used for remote monitoring in a port or the like. In addition, in order to perform picking up images in nighttime or in dense fog, it is required to have high optical performance in a wavelength range from visible to near infrared.

As a zoom lens having such a high zoom ratio, a positive lead type zoom lens has been proposed.

Japanese Patent Application Laid-Open No. 2016-95448 discloses a zoom lens including, in order from an object side to an image side, a first lens unit having a positive refractive power, a second lens unit having a negative refractive power, a third lens unit having a positive refractive power, and a fourth lens unit having a positive refractive power, wherein the second lens unit and the third lens unit move along an optical axis and have a zoom ratio of about 20. In the zoom lens, a refractive index at a near infrared wavelength of 1700 nm is specified and aberration correction in a wavelength range from visible to near infrared is carried out.

Japanese Patent Application Laid-Open No. 2021-76780 discloses a zoom lens including, in order from an object side to an image side, a first lens unit having a positive refractive power, a second lens unit having a negative refractive power, a third lens unit having a positive refractive power, and a fourth lens unit having a positive refractive power, wherein the second lens unit and the third lens unit move along an optical axis and have a zoom ratio of about 60. In the zoom lens, a refractive index at a near infrared wavelength of 1970 nm is specified and aberration correction in a wavelength range from visible to near infrared is carried out.

In a monitoring zoom lens having a wide angle and a high zoom ratio, it is difficult to correct axial chromatic aberration at the wide angle end.

The zoom lenses described in Japanese Patent Application Laid-Open No. 2016-95448 and Japanese Patent Application Laid-Open No. 2021-76780 do not sufficiently correct chromatic aberration from a wavelength range of visible light to a wavelength range (wavelength: 0.9 to 1.71 μm) of short wavelength infrared (SWIR) light.

SUMMARY OF THE INVENTION

The present disclosure provides a zoom lens which is beneficial in, for example, a high zoom ratio and high optical performance in a wavelength range from visible light to SWIR light.

In one aspect of the present disclosure, a zoom lens including, in order from an object side to an image side, a first lens unit having a positive refractive power which does not move for zooming, a plurality of movable lens units including at least one lens unit having a negative refractive power, and a rear lens unit having a positive refractive power which does not move for zooming, in which an interval between lens units adjacent to each other changes for zooming, and the following inequalities are satisfied, $$3.5 \leq ft/f1 \leq 6.0$$

$$4.7 \leq fw/Fnw \leq 12.0$$

where fw represents a focal length of the zoom lens when focused on an infinity object at the wide angle end, ft represents a focal length of the zoom lens when focused on the infinity object at the telephoto end, f1 represents a focal length of the first lens unit, Fnw represents an F number at a maximum aperture of the zoom lens at the wide angle, in which the rear lens unit includes a plurality of negative lenses formed of a material that satisfies the following inequalities, $$1.55 \leq Ndn \leq 1.75$$

$$2.10 \leq \theta sn \leq 2.60$$

where Ndn represents a refractive index with respect to the d-line and θsn represents a first partial dispersion ratio which is defined as follows, $$\theta s = (NC - N1970)/(NF - NC)$$

where NC, NF, and N1970 represent refractive indices for the wavelengths of C-line, F-line, and 1970 nm, respectively.

Further features of the present invention will become apparent from the following description of exemplary embodiments with reference to the attached drawings.

BRIEF DESCRIPTION OF THE DRAWINGS

FIG. 2A is an aberration diagram of Numerical Embodiment 1 when focused on the infinity object at the wide angle end.

FIG. 2B is an aberration diagram of Numerical Embodiment 1 when focused on the infinity object with a focal length of 93.4 mm.

FIG. 2C is an aberration diagram of Numerical Embodiment 1 when focused on the infinity object at the telephoto end.

FIG. 4C is an aberration diagram of Numerical Embodiment 2 when focused on the infinity object at the telephoto end.

FIG. 5 is a lens cross-sectional view of Numerical Embodiment 3 when focused on the infinity object at the wide angle end.

FIG. 6A is an aberration diagram of Numerical Embodiment 3 when focused on the infinity object at the wide angle end.

FIG. 6B is an aberration diagram of Numerical Embodiment 3 when focused on the infinity object with a focal length of 131.0 mm.

FIG. 6C is an aberration diagram of Numerical Embodiment 3 when focused on the infinity object at the telephoto end.

FIG. 8A is an aberration diagram of Numerical Embodiment 4 when focused on the infinity object at the wide angle end.

FIG. 8B is an aberration diagram of Numerical Embodiment 4 when focused on the infinity object with a focal length of 120 mm.

FIG. 8C is an aberration diagram of Numerical Embodiment 4 when focused on the infinity object at the telephoto end.

FIG. 9 is a lens cross-sectional view of Numerical Embodiment 5 when focused on the infinity object at the wide angle end.

FIG. 10C is an aberration diagram of Numerical Embodiment 5 when focused on the infinity object at the telephoto end.

DESCRIPTION OF THE EMBODIMENTS

Figure 1:
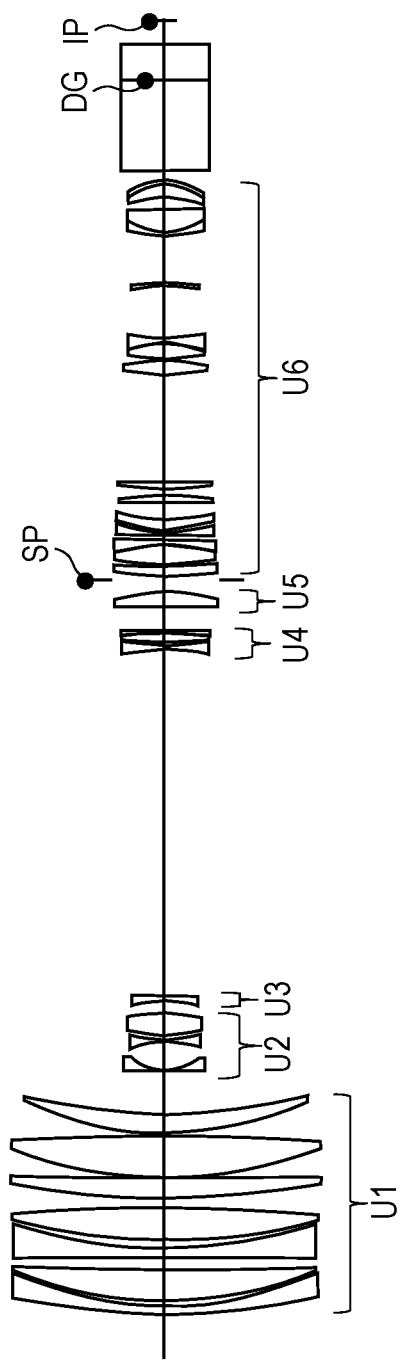
FIG. 1 is a lens cross-sectional view of Numerical Embodiment 1 when focused on an infinity object at a wide angle end.

Preferred embodiments of the present disclosure will now be described in detail with reference to the accompanying drawings.

Conventionally, a zoom lens having a high zoom ratio and high optical performance is required for an image pickup apparatus such as a monitoring video camera used for far monitoring in a port or the like. In particular, an image pickup device as an image capturing system for advanced monitoring has a high light receiving sensitivity in a wavelength range from visible to near infrared for picking up images at night or at the time of dense fog. Therefore, it is required that the optical performance from the visible range to the near infrared range is corrected at a good level in a zoom lens used in the image pickup device.

In a zoom lens for a monitoring camera that utilizes both visible light and near infrared light, in many cases, near infrared light of a wavelength range from 1000 to the vicinity of 2000 nm, so-called NIR (Near InfraRed) to SWIR range is used for nighttime photographing. In order to obtain good image pickup performance in the near infrared range, it is ideal that aberrations from visible light to near infrared light are corrected to zero. However, in actual zoom lenses, axial chromatic aberration and chromatic aberration of magnification are remained in the infrared range. Among them, since the remaining axial chromatic aberration of the infrared light greatly affects an image quality as a focus shift at the time of infrared photographing, various means for satisfactorily correcting the near infrared aberration in the zoom lens and further adjusting means for the near infrared are provided.

In addition, conventionally, in a high-magnification zoom lens suitable for a monitoring camera, a contrivance has been provided in which a focusing mechanism is provided in the first lens unit to suppress the amount of movement even at the telephoto side where axial chromatic aberration is likely to be enlarged. However, on the wide-angle end side, as the zoom lens becomes a high-magnification zoom lens, the focusing sensitivity of the first lens unit tends to be lower, and there is a problem that the driving amount for bringing a condition of out of focus due to near-infrared axial chromatic aberration into an in-focus condition increases, and hence the lens becomes large. Similarly, the amount of adjustment also increases in the flange back adjustment mechanism provided in the rear lens unit of the zoom lens, which is disadvantageous for size reduction and simplification of the system. In general, even at the wide angle end where the amount of generation of axial chromatic aberration is small, axial chromatic aberration in the near-infrared region with an amount exceeding the depth of focus can be generated, and therefore, suppression of near-infrared axial chromatic aberration is essential in order to realize good focusing with a small-size and light-weight lens. As described above, it is necessary to satisfactorily correct the near-infrared axial chromatic aberration at the wide-angle end in the zoom lens for monitoring which performs the process from a wide-area search to a specification of an object.

It is an object of the present disclosure to provide a zoom lens having good image pickup performance for light in a wide wavelength range from a visible range to a near infrared range at a high zoom ratio.

First, features of the zoom lens according to the present disclosure will be described in accordance with each inequality. In order to achieve a zoom lens having a high zoom ratio and high optical performance in a visible to near infrared wavelength range over the entire zoom range, the present disclosure defines a power arrangement of the zoom lens and characteristics of an optical material adopted in each lens unit. Specifically, it is possible to provide a zoom lens in which axial chromatic aberration with respect to a visible to near infrared wavelength range is satisfactorily corrected at a zoom ratio of about 20 to 150, particularly at a wide angle end.

A zoom lens according to the present disclosure includes, in order from the object side to the image side, a first lens unit having a positive refractive power which does not move for zooming and moves entirely or partially on an optical axis for focusing, a plurality of movable lens units including at least one lens unit having a negative refractive power, and a rear lens unit having a positive refractive power which does not move for zooming, wherein an interval between lens units adjacent to each other changes for zooming, and the following inequalities are satisfied, $$3.5 \le ft/f1 \le 6.0 \quad (1)$$

$$4.7 \le fw/Fnw \le 12.0 \quad (2)$$

where fw represents a focal length of the zoom lens when focused on an infinity object at the wide angle end, ft represents a focal length of the zoom lens when focused on the infinity object at the telephoto end, f1 represents a focal length of the first lens unit, Fnw represents an F number at a maximum aperture at the wide angle end of the zoom lens, in which the rear lens unit includes a plurality of negative lenses formed of a material that satisfies the following inequalities, $$1.55 \le Ndn \le 1.75 \quad (3)$$

$$2.10 \le \theta sn \le 2.60 \quad (4)$$

where Ndn represents a refractive index with respect to the d-line and θsn represents a first partial dispersion ratio θs of the negative lens wherein the first partial dispersion ratio θs is defined as follows, $$\theta s=(NC-N1970)/(NF-NC) \quad (a)$$

where NC, NF, and N1970 represent refractive indices for the wavelengths of C-line, F-line, and 1970 nm, respectively.

The zoom lens of the present disclosure is a zoom lens of positive lead type in which a first lens unit having a positive refractive power is disposed, and is configured to have a power arrangement suitable for a monitoring zoom lens that satisfies the above-mentioned inequalities (1) and (2).

The first lens unit does not move for zooming, and the whole or a part of the first lens unit moves in the optical axis direction for focusing. The lens units disposed in the image side comprise two or more movable lens units including at least one lens unit having a negative refractive power, and a rear lens unit having a positive refractive power which does not move for zooming. An aperture stop is disposed between lens units disposed in the image side of the first lens unit or in the lens unit. A focal length conversion optical system that converts the focal length of the entire zoom lens by inserting or removing different lens units into or from the optical path in the rear lens unit or on the object side or on the image side of the rear lens unit may be provided. Further, a back drive mechanism may be provided so that the entire or a part of the rear lens unit can be slightly moved along the optical axis to suppress the focus fluctuation during zooming to almost zero over the entire zoom range.

The inequalities (1) and (2) define the zoom lens configuration that can exhibit the most effective effect of the present disclosure. The inequality (1) defines the ratio between the focal length of the zoom lens at the telephoto end and the focal length of the first lens unit. By satisfying the inequality (1), it is possible to configure the power relationship of the first lens unit suitable for the specification and performance of the monitoring lens. If the upper limit of the inequality (1) is not satisfied, the focal length of the first lens unit becomes relatively short, and the aberration enlargement ratio caused by lens units in the image side of the first lens unit becomes large, making it difficult to suppress the axial chromatic aberration on the telephoto end. If the lower limit of the inequality (1) is not satisfied, the focal length of the first lens unit becomes relatively long, and it becomes difficult to achieve a reduction in size and weight of the lens system and a sufficient focal length at the telephoto end.

More preferably, the inequality (1) is set as follows.

$$3.6 \leq ft/f1 \leq 5.8 \quad (1a)$$

More preferably, the inequality (1a) is set as follows.

$$3.7 \leq ft/f1 \leq 5.6 \quad (1aa)$$

More preferably, the inequality (1aa) is set as follows.

$$3.8 \leq ft/f1 \leq 5.4 \quad (1aaa)$$

The inequality (2) defines the ratio between the focal length at the wide angle end and the F number at the wide angle end of the zoom lens. By satisfying the inequality (2), it is possible to configure an appropriate power relationship between the focal length at the wide angle end and the bright F-number corresponding to the monitoring lens. If the upper limit of the inequality (2) is not satisfied, the F number at the wide angle end becomes relatively small (bright), and the system becomes too large and the depth of focus becomes too shallow. If the lower limit of the inequality (2) is not satisfied, the focal length of the rear lens unit becomes relatively too long, and it becomes difficult to achieve both a small F-number and an appropriate focal length at the wide angle end.

More preferably, the inequality (2) is set as follows.

$$4\ 0.8 \leq fw/Fnw \leq 11.5 \quad (2a)$$

More preferably, the inequality (2a) is set as follows.

$$4\ 0.9 \leq fw/Fnw \leq 11.0 \quad (2aa)$$

More preferably, the inequality (2aa) is set as follows.

$$5.0 \leq fw/Fnw \leq 10.5 \quad (2aaa)$$

Inequalities (3) and (4) define a rear lens unit configuration for achieving aberration correction appropriate for a monitoring lens compatible with infrared of the present disclosure. The inequality (3) defines the condition that the refractive index Ndn of the optical material in the plurality of negative lenses included in the rear lens unit of the zoom lens. By satisfying the inequality (3), it becomes possible to select an optical material advantageous for the infrared aberration correction and the Petzval sum correction among the aberration correction performed by the negative lens in the rear lens unit. If the upper limit of the inequality (3) is not satisfied, it becomes difficult to select an optical material advantageous for correcting infrared aberration in existing optical glass materials. If the lower limit of the inequality (3) is not satisfied, it becomes difficult to select an optical material advantageous for correcting the Petzval sum.

More preferably, the inequality (3) is set as follows.

$$1.57 \leq Ndn \leq 1.73 \quad (3a)$$

More preferably, the inequality (3a) is set as follows.

$$1.59 \leq Ndn \leq 1.71 \quad (3aa)$$

More preferably, the inequality (3aa) is set as follows.

$$1.61 \leq Ndn \leq 1.67 \quad (3aaa)$$

The inequality (4) defines the condition of the partial dispersion ratio of the optical material in the plurality of negative lenses included in the rear lens unit of the zoom lens. In the present disclosure, a first partial dispersion ratio θs defined by the following equation is adopted in the optical material forming the negative lens, $$\theta s=(NC-N1970)/(NF-NC) \quad (a)$$

where NC, NF and N1970 represent the refractive indexes for wavelengths of C-line (656.3 nm), F-line (486.1 nm) of the Fraunhofer line and 1970 nm, respectively. The reason why the above-described wavelengths are adopted in the present disclosure is that the refractive index information can be easily obtained from formal catalogs of various glass manufacturers (for example, OHARA) among the wavelengths in the visible to SWIR ranges. The zoom lens of the present disclosure can exhibit good optical performance not only at the above-described wavelength but also at wavelengths in the visible to SWIR ranges.

Figure 11:
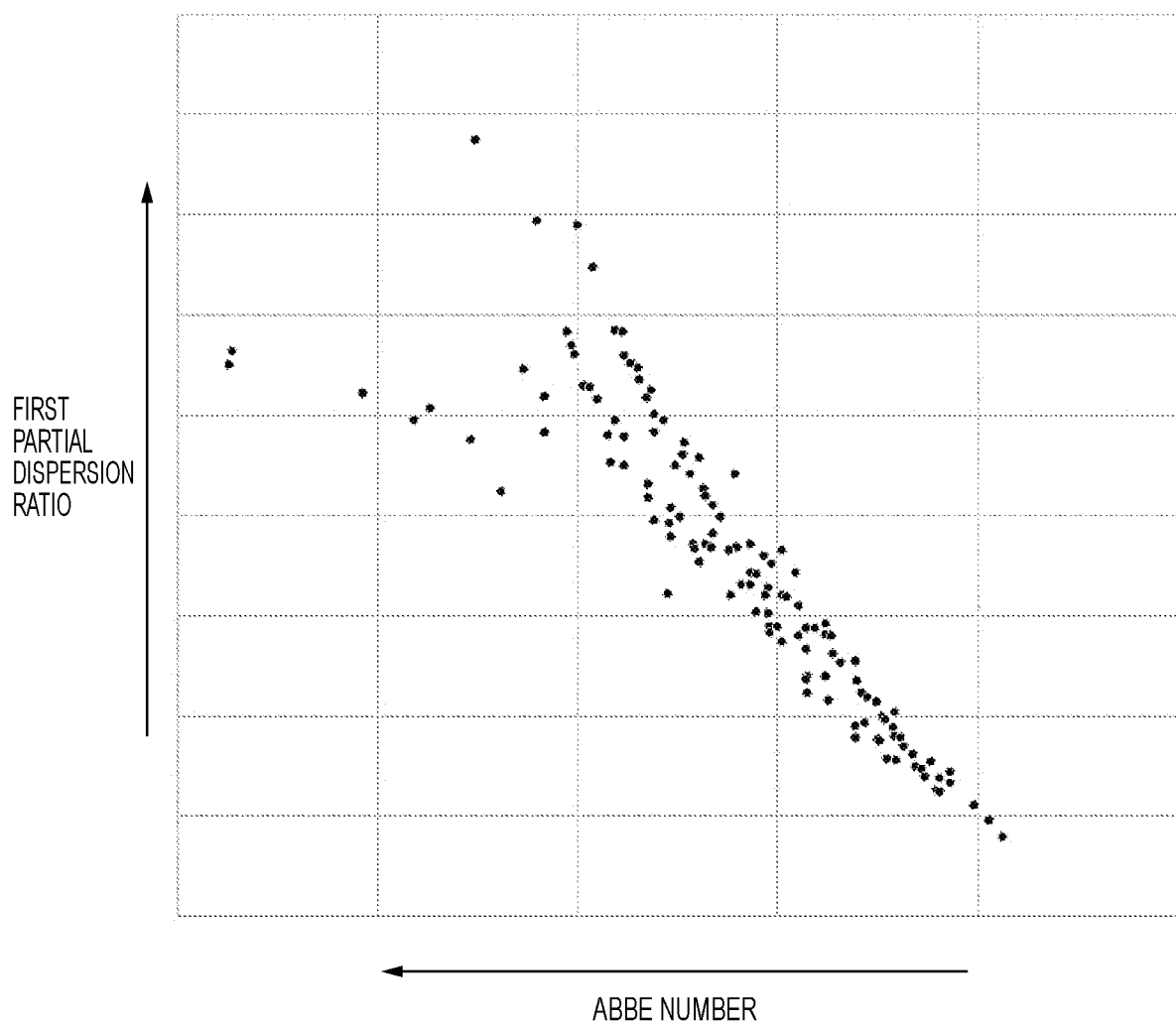
FIG. 11 is a schematic diagram of distribution of existing optical materials.

The relationship of chromatic aberration correction of the present disclosure will now be described. As shown in FIG. 11, existing optical materials are distributed within a narrow range of the first partial dispersion ratio with respect to the Abbe number, and the larger the Abbe number, the larger the first partial dispersion ratio. The axial chromatic aberration coefficient L and the magnification chromatic aberration coefficient T of a thin-walled close-contact lens system, having a predetermined refractive power Φ, composed of two lenses Gp and Gn are expressed by the following equations (c) and (d), respectively, $$L = h \times h \times (\Phi p/vp + \Phi n/vn) \quad (c)$$

$$T = h \times H \times (\Phi p/vp + \Phi n/vn) \quad (d)$$

where $\Phi p$ represents a positive refractive power of the lens Gp, $\Phi n$ represents a negative refractive power of the lens Gn, vp and vn represent Abbe numbers of the lenses Gp and Gn, respectively, h represents an incident height of an axial paraxial ray, and H represents an incident height of a pupil paraxial ray. Here, $$\Phi = \Phi p + \Phi n \quad (e)$$

is assumed.

The axial paraxial ray and the pupil paraxial ray are defined as follows. The axial paraxial ray is a paraxial ray obtained by normalizing the focal length at the wide-angle end of the entire optical system to 1 and incident on the optical system in parallel with the optical axis and with an incident height of 1. The pupil paraxial ray is a paraxial ray passing through an intersection of the entrance pupil of the optical system and the optical axis among rays which are incident on the maximum image height of the imaging plane with a focal length at the wide angle end of the entire optical system being normalized as 1.

The refractive powers $\Phi p$ and $\Phi n$ of the lenses in the equations (c) and (d) are normalized so that $\Phi = 1$ in the equation (e). Cases including three or more lenses can be considered in the same manner. When L=0 and T=0 in the equations (c) and (d), the imaging positions of C-line and F-line on the axis and on the image plane coincide with each other. Correction of chromatic aberration with respect to two predetermined wavelengths is generally referred to as two-wavelength achromatism (primary spectrum correction). In particular, in a high-magnification zoom lens, in order to suppress chromatic aberration variation due to zooming, the chromatic aberrations of each lens unit, i.e., L and T, is corrected to be substantially close to zero.

At this time, a shift amount of the axial chromatic aberration and a shift amount of the magnification chromatic aberration of C-line with respect to 1970 nm when a light flux is incident with the object distance being set to infinity are defined as a secondary spectrum amount $\Delta s$ of the axial chromatic aberration and a secondary spectrum amount $\Delta y$ of the magnification chromatic aberration, respectively, which are represented by the following equations, $$\Delta s = -h \times h \times (\theta p - \theta n)/(vp - vn) \times f \quad (f)$$

$$\Delta y = -h \times H \times (\theta p - \theta n)/(vp - vn) \times Y \quad (g)$$

where f represents the focal length of the entire zoom lens system, and Y represents the image height. In this way, correction of chromatic aberration with respect to specific three wavelengths by further adding a specific wavelength is generally referred to as three-wavelength achromatism (secondary spectrum correction).

With the demand for higher specifications of zoom lenses, the focal length f of the equation (f) increases as the zoom ratio of higher magnification is achieved, and therefore, it becomes difficult to reduce the secondary spectrum of the axial chromatic aberration. In particular, in a zoom lens for monitoring purposes, it is important to suppress the axial chromatic aberration from the wide-angle end because a zoom lens having a long focal length at the wide-angle end is appreciated. In each of the embodiments of the present disclosure, there is provided a technology for satisfactorily correcting the primary and secondary axial chromatic aberrations from the visible range to the near-infrared range, which are effective in offset components from the wide-angle end to the telephoto end, while achieving high specifications suitable for the monitoring zoom lens.

By satisfying the inequality (4), it becomes possible to select an optical material beneficial in correction of the infrared axial aberration among the aberration correction performed by the negative lens in the rear lens unit. If the upper limit condition of the inequality (4) is not satisfied, it becomes difficult to select an optical material beneficial in achieving both the correction of visible aberration and infrared aberration in existing optical glass materials. If the lower limit of the inequality (4) is not satisfied, the correction of the infrared axial chromatic aberration of the negative lens in the rear lens unit is insufficient, which is not preferable.

More preferably, the inequality (4) is set as follows.

$$2.11 \leq \theta sn \leq 2.55 \quad (4a)$$

More preferably, the inequality (4a) is set as follows.

$$2.15 \leq \theta sn \leq 2.50 \quad (4aa)$$

More preferably, the inequality (4aa) is set as follows.

$$2.20 \leq \theta sn \leq 2.45 \quad (4aaa)$$

From the above, by simultaneously employing the techniques of the inequalities (1) to (4) in the zoom lens according to the present disclosure, it is possible to achieve both the optimal power arrangement of the lens units particularly for the high-magnification zoom lens for monitoring and the suppression of the axial chromatic aberration from visible to infrared from the wide-angle end.

As a further aspect of the zoom lens of the present disclosure, the material forming the negative lens satisfies the following inequality (5), $$0.825 \leq \theta tn \leq 0.900 \quad (5)$$

where $\theta tn$ represents the second partial dispersion ratio of the material, the second partial dispersion ratio Otis defined by the following equation, $$\theta t = (NC - Nt)/(NF - NC) \quad (b)$$

where Nt represents a refractive index with respect to wavelength oft-line (1014 nm).

The inequality (5) defines the condition of the partial dispersion ratio of the optical material in the plurality of negative lenses included in the rear lens unit of the zoom lens similarly to the inequality (4), and particularly defines the secondary partial dispersion ratio with respect to t-line (1014 nm). In the inequality (4), the first partial dispersion ratio with respect to 1970 nm is defined to define the chromatic aberration correction in a long wavelength range called SWIR among near infrared wavelengths, but when it is desired to manage the aberration correction in a range so-called NIR in the vicinity of 1000 to 1300 nm located between visible and SWIR, it is preferable to define and manage the secondary spectrum in this wavelength range. Accordingly, by satisfying the chromatic aberration correction in the vicinity of the NIR described above according to the inequality (5), the axial chromatic aberration throughout the wavelength range from visible to NIR and SWIR can be satisfactorily corrected.

By satisfying the inequality (5), it becomes possible to select an optical material beneficial in correcting the infrared axial aberration in the NIR range among the aberration correction performed by the negative lens in the rear lens unit. If the upper limit condition of the inequality (5) is not satisfied, it becomes difficult to select an optical material beneficial in achieving both correction of aberrations with respect to visible light and infrared light in the existing optical glass materials. If the lower limit of the inequality (5) is not satisfied, the correction of the infrared axial chromatic aberration of the negative lens in the rear lens unit is insufficient, which is not preferable.

More preferably, the inequality (5) is set as follows.

$$0.830 \leq \theta tn \leq 0.890 \tag{5a}$$

More preferably, the inequality (5a) is set as follows.

$$0.832 \leq \theta tn \leq 0.875 \tag{5aa}$$

More preferably, the inequality (5aa) is set as follows.

$$0.834 \leq \theta tn \leq 0.866 \tag{5aaa}$$

According to a further aspect of the zoom lens of the present disclosure, the following inequality (6) is satisfied, $$50 \leq vn \leq 97 \tag{6}$$

where vn represents the Abbe number of the optical material forming each of the plurality of negative lenses.

The inequality (6) defines the range of the Abbe number of the optical material forming the plurality of negative lenses included in the rear lens unit of the zoom lens. By satisfying the inequality (6), it becomes possible to select an optical material having an appropriate dispersion value and partial dispersion value as a negative lens in the rear lens unit. If the upper limit of the inequality (6) is not satisfied, the degree of freedom of selection of existing optical material is narrow, and it is difficult to appropriately correct the axial chromatic aberration from visible to near infrared. If the lower limit of the inequality (6) is not satisfied, it is not possible to make the negative lens have an appropriate partial dispersion ratio, which makes it difficult to correct the near infrared axial chromatic aberration.

More preferably, the inequality (6) is set as follows.

$$52 \leq vn \leq 70 \tag{6a}$$

More preferably, the inequality (6a) is set as follows.

$$53 \leq vn \leq 65 \tag{6aa}$$

More preferably, the inequality (6aa) is set as follows.

$$54 \leq vn \leq 61 \tag{6aaa}$$

In a further aspect of the zoom lens according to the present disclosure, the following inequalities are satisfied, $$55 \leq vp \leq 120 \tag{7}$$

$$1.75 \leq \theta sp < 2.38 \tag{8}$$

$$2.7 \times 10^{-3} \leq (\theta sn - \theta sp)/(vp - vn) \tag{9}$$

where vp represents the Abbe number of an optical material forming a positive lens disposed adjacent to or cemented with the negative lens and θsp represents a first partial dispersion ratio θs of the positive lens, where the first partial dispersion ratio θs is defined by the following equation.

$$\theta s = (NC - N1970)/(NF - NC) \tag{a}$$

The inequalities (7) to (9) define the condition of the partial dispersion ratio of the optical material in each of the plurality of positive lenses that are disposed adjacent to or cemented with the plurality of negative lenses included in the rear lens unit of the zoom lens to form a chromatic aberration correction. As described above, when the secondary spectrum at a predetermined wavelength is set to zero, the three-wavelength achromatism is established, but since a combination of optical materials of the positive lens and the negative lens having partial dispersion ratios close to each other is limited in options, it is difficult to correct the primary spectrum and various aberrations represented by Seidel five aberrations. Accordingly, in the infrared chromatic aberration correction of the present disclosure, a low dispersion material is adopted as in the inequalities (7) to (9), and the chromatic aberration correction by the negative lens is configured to be slightly excessive, thereby making it easier to obtain the overall aberration correction balance with other lens units and the like.

The inequality (7) defines a range of Abbe numbers of a plurality of positive lenses included in the rear lens unit. By satisfying the inequality (7), it is possible to increase the difference in Abbe number between the positive lens and the negative lens in the rear lens unit, and it is possible to select optical materials beneficial in first-order chromatic aberration correction. If the upper limit of the inequality (7) is not satisfied, the degree of freedom of selection of existing optical materials is narrow, and it is difficult to appropriately correct the axial chromatic aberration from visible to near infrared. If the lower limit of the inequality (7) is not satisfied, a combination that sufficiently increases the Abbe number difference between the positive lens and the negative lens cannot be selected, making it difficult to correct the primary spectrum.

More preferably, the inequality (7) is set as follows.

$$58 \leq vp \leq 110 \tag{7a}$$

More preferably, the inequality (7a) is set as follows.

$$62 \leq vp \leq 100 \tag{7aa}$$

More preferably, the inequality (7aa) is set as follows.

$$67 \leq vp \leq 97 \tag{7aaa}$$

By satisfying the inequality (8), it becomes possible to select a positive lens which is beneficial in the near infrared aberration correction among optical materials having low dispersion and extraordinary dispersion with respect to visible light. If the upper limit condition of the inequality (8) is not satisfied, the degree of freedom of selection of existing optical materials is narrow, and it becomes difficult to appropriately correct axial chromatic aberration from visible to near infrared. If the lower limit condition of the inequality (8) is not satisfied, a combination that sufficiently increases the Abbe number difference between the positive lens and the negative lens cannot be selected in the existing optical materials, and it becomes difficult to correct the primary spectrum.

More preferably, the inequality (8) is set as follows.

$$1.80 \leq \theta sp \leq 2.17 \tag{8a}$$

More preferably, the inequality (8a) is set as follows.

$$1.84 \leq \theta sp \leq 2.15 \tag{8aa}$$

More preferably, the inequality (8aa) is set as follows.

$$1.94 \leq \theta sp \leq 2.13 \tag{8aaa}$$

By satisfying the inequality (9), it is possible to further efficiently retain the ability to correct the infrared chromatic aberration in the rear lens unit. The upper limit condition of the inequality (9) is not provided because, for example, a combination of positive and negative lenses having almost no difference in Abbe number and a large difference in the first partial dispersion ratio is within an assumption. If the lower limit condition of the inequality (9) is not satisfied, the correction of the infrared axial chromatic aberration in the rear lens unit is insufficient, which is not preferable.

More preferably, the inequality (9) is set as follows.

$$5.2\times10^{-3} \leq (\theta sn-\theta sp)/(vp-vn) \tag{9a}$$

More preferably, the inequality (9a) is set as follows.

$$8.0\times10^{-3} \leq (\theta sn-\theta sp)/(vp-vn) \tag{9aa}$$

More preferably, the inequality (9aa) is set as follows.

$$1.5\times10^{-2} \leq (\theta sn-\theta sp)/(vp-vn) \tag{9aaa}$$

As a further aspect of the zoom lens according to the present disclosure, the following inequality (10) is satisfied, $$0 \leq (\theta sna-\theta spa)/(vpa-vna) \leq 6.1\times10^{-2} \tag{10}$$

where vna and θsna represent average values of Abbe number vn and the first partial dispersion ratio θsn of all of the negative lenses included in the rear lens unit, respectively, and vpa and θspa represent average values of Abbe number vp and the first partial dispersion ratio θsp of all of the positive lenses included in the rear lens unit, respectively.

The inequality (10) defines the relationship between the average Abbe number and the average partial dispersion ratio of all the negative lenses and all of the positive lenses included in the rear lens unit. By satisfying the inequality (10), it is possible to achieve the secondary spectrum correction for the near infrared light in the rear lens unit more satisfactorily. If the upper limit condition of the inequality (10) is not satisfied, the secondary spectrum of the rear lens unit with respect to the near infrared light becomes overcorrected, which is not preferable. If the lower limit condition of the inequality (10) is not satisfied, the secondary spectrum of the rear lens unit with respect to the near infrared light becomes insufficiently corrected, which is not preferable.

More preferably, the inequality (10) is set as follows.

$$4.3\times10^{-5} \leq (\theta sna-\theta spa)/(vpa-vna) \leq 2.0\times10^{-2} \tag{10a}$$

More preferably, the inequality (10a) is set as follows.

$$1.3\times10^{-3} \leq (\theta sna-\theta spa)/(vpa-vna) \leq 1.5\times10^{-2} \tag{10aa}$$

More preferably, the inequality (10aa) is set as follows.

$$1.0\times10^{-2} \leq (\theta sna-\theta spa)/(vpa-vna) \leq 1.1\times10^{-2} \tag{10aaa}$$

According to a further aspect of the zoom lens of the present disclosure, at least one or more of the plurality of negative lenses in the rear lens unit satisfies the following inequality (11), $$-8.0 \leq fr/fn \leq -1.2 \tag{11}$$

where fr represents a focal length of the rear lens unit and fn represents a focal length of each of the plurality of negative lenses in a single lens state.

The inequality (11) defines the relationship between the focal length of the rear lens unit and the focal length of the negative lens included in the rear lens unit in the single lens state. By satisfying the inequality (11), it is possible to give an appropriate power to the negative lens in the rear lens unit, and it is possible to further satisfactorily correct near-infrared axial chromatic aberration. If the upper limit condition of the inequality (11) is not satisfied, it is impossible to give an appropriate power to the negative lens, which causes insufficient correction of the near-infrared axial chromatic aberration, which is not preferable. If the lower limit condition of the inequality (11) is not satisfied, the curvature of the negative lens becomes too large which causes high-order aberration and is not preferable.

More preferably, the inequality (11) is set as follows.

$$-7.0 \leq fr/fn \leq -1.3 \tag{11a}$$

More preferably, the inequality (11a) is set as follows.

$$-6.0 \leq fr/fn \leq -1.4 \tag{11aa}$$

More preferably, the inequality (11aa) is set as follows.

$$-5.0 \leq fr/fn \leq -1.5 \tag{11aaa}$$

According to a further aspect of the zoom lens of the present disclosure, the following inequality (12) is satisfied, $$-6.0 \leq kna \leq -1.0 \tag{12}$$

where kna represents an average value of fr/fn for all the negate.ve lenses included in the rear lens unit.

The inequality (12) defines the relationship between the focal length of all the negative lenses included in the rear lens unit in the single lens state and the focal length of the rear lens unit. By satisfying the inequality (12), it is possible to give an appropriate power to the negative lens as a whole of the rear lens unit, and it is possible to satisfactorily correct the near-infrared axial chromatic aberration while further ensuring the degree of freedom of correction of other aberrations. If the upper limit condition of the inequality (12) is not satisfied, it is impossible to give an appropriate power to the negative lens as a whole of the rear lens unit, which causes insufficient correction of the near-infrared axial chromatic aberration, which is not preferable. If the lower limit condition of the inequality (12) is not satisfied, the curvature of the negative lens becomes too large which causes high-order aberration and is not preferable.

More preferably, the inequality (12) is set as follows.

$$-5.0 \leq kna \leq -1.05 \tag{12a}$$

More preferably, the inequality (12a) is set as follows.

$$-4.0 \leq kna \leq -1.3 \tag{12aa}$$

More preferably, the inequality (12aa) is set as follows.

$$-3.6 \leq kna \leq -1.5 \tag{12 aaa}$$

Further, the image pickup apparatus of the present disclosure includes the zoom lens of each embodiment and an image pickup element having a predetermined effective image pickup range for receiving an image formed by the zoom lens.

Hereinafter, specific configurations of the zoom lens of the present disclosure will be described based on characteristics of lens configurations of Numerical Embodiments 1 to 5 corresponding to Embodiments 1 to 5.

Embodiment 1

FIG. 1 is a lens cross-sectional view of a zoom lens according to Embodiment 1 (Numerical Embodiment 1) of the present disclosure when focused on an infinity object at a wide angle end. FIGS. 2A, 2B, and 2C show longitudinal aberration diagrams at the wide angle end, at the focal length of 93.4 mm, and at the telephoto end, respectively, of Numerical Embodiment 1. The aberration diagrams each are longitudinal aberration diagrams when focused on the infinity object. The value of the focal length is a value obtained by expressing numerical embodiments described later in mm units. The same applies to the following numerical embodiments.

In FIG. 1, the zoom lens includes in order from the object side to the image side: a first lens unit U1 having a positive refractive power for focusing; a second lens unit U2 having a negative refractive power that moves toward the image side for zooming from the wide angle end to the telephoto end; a third lens unit U3 having a negative refractive power that moves for zooming; a fourth lens unit U4 having a positive refractive power that moves for zooming; and a fifth lens unit U5 having a positive refractive power that moves non-linearly on the optical axis in conjunction with the movement of the second lens unit U2, the third lens unit U3, and the fourth lens unit U4 and corrects an image plane variation due to zooming. Further, the zoom lens includes a sixth lens unit U6 having a positive refractive power and having an imaging function which does not move for zooming.

In this embodiment, the second lens unit U2, the third lens unit U3, the fourth lens unit U4, and the fifth lens unit U5 constitute a zoom system. The rear lens unit corresponds to the sixth lens unit U6. Reference numeral SP denotes an aperture stop disposed between the fifth lens unit U5 and the sixth lens unit U6. Reference numeral IP denotes an image plane, which corresponds to an image plane of a solid-state image pick up device (photoelectric conversion element) or the like which receives an image formed by the zoom lens and performs photoelectric conversion when used as an image pick up optical system of a broadcast television camera, a video camera, or a digital still camera. When used as an image pick up optical system of a film camera, it corresponds to a film surface which is exposed to an image formed by the zoom lens. Reference numeral DG denotes a glass block corresponding to an optical filter and a color separation optical system in the image pickup apparatus.

In the longitudinal aberration diagrams, solid lines, two-dot broken lines, one-dot broken lines, broken lines, and dotted lines in spherical aberration diagrams and magnification chromatic aberration diagrams indicate e-line, F-line, C-line, t-line, and 1970 nm, respectively. Broken lines and solid lines in astigmatism diagrams represent a meridional image plane and a sagittal image plane, respectively. ω represents a half angle of view, and Fno represents an aperture ratio (F number). In the longitudinal aberration diagrams, spherical aberration is drawn on a scale of 1.0 mm, astigmatism is drawn on a scale of 1.0 mm, distortion is drawn on a scale of 5%, and chromatic aberration of magnification is drawn on a scale of 0.25 mm. In each of the following embodiments, the wide angle end and the telephoto end indicate zoom positions when the second lens unit U2 for zooming is positioned at both ends of a range in which the second lens unit U2 can be moved on the optical axis with respect to the mechanism.

The first lens unit U1 corresponds to the first to fourteenth surfaces. The second lens unit U2 corresponds to the fifteenth to twentieth surfaces. The third lens unit U3 corresponds to the twenty-first to twenty-second surfaces. The fourth lens unit U4 corresponds to the twenty-third to twenty-seventh surfaces. The fifth lens unit U5 corresponds to the twenty-eighth to twenty-ninth surfaces. The aperture stop corresponds to the thirtieth surface. The sixth lens unit U6 corresponds to the thirty-first to fifty-sixth surfaces. The fifty-seventh to fifty-ninth surfaces correspond to dummy lens units of the camera optical system.

The first lens unit U1 includes a first sub lens unit U11 having a negative refractive power that does not move for focusing, a second sub lens unit U12 having a positive refractive power that moves toward the image side for focusing from the infinity side to the close side, and a third sub lens unit U13 having a positive refractive power that moves toward the image side for focusing from the infinity side to the close side. The first sub lens unit U11 corresponds to the first to eighth surfaces, the second sub lens unit U12 corresponds to the ninth to twelfth surfaces, and the third sub lens unit U13 corresponds to the thirteenth to fourteenth surfaces.

Numerical Embodiment 1 corresponding to Embodiment 1 will be described. In Numerical Embodiment 1 and all Numerical Embodiments, i denotes the order of the surfaces (optical surfaces) from the object side, ri denotes the radius of curvature of the i-th surface counted from the object side, and di denotes the distance (on the optical axis) between the i-th surface and the (i+1)-th surface counted from the object side. Further, ndi, vdi, θsi, and θti represent refractive index of the medium (optical member) between the i-th surface and the (i+1)-th surface, Abbe number, the first partial dispersion ratio θs defined by the equation (a), the second partial dispersion ratio θt defined by the equation (b), and the back focus in air. The aspherical shape is expressed by the following expression, where the X axis is the optical axis direction, the H axis is the direction perpendicular to the optical axis, the traveling direction of the light is positive, R is the radius of curvature of the paraxial axis, k is conic constant, and A3 to A16 are aspherical coefficients. Further, "e-Z" means "×10$^{-Z}$".

$$X=(H^2/R)/(1+(1-(1+k)(H/R)^2)^{1/2})+A4H^4+A6H^6+\\A8H^8+A10H^{10}+A12H^{12}+A14H^{14}+A16H^{16}+\\A3H^3+A5H^5+A7H^7+A9H^9+A11H^{11}+A13H^{13}+\\A15H^{15}$$

Table 1 shows values corresponding to the inequalities of the present embodiment. The present embodiment satisfies the inequalities (1) to (12) as appropriate, and by appropriately setting the chromatic aberration correction and the power arrangement in the rear lens unit, it is possible to achieve a zoom lens which is suitable for a high-magnification zoom lens for monitoring and has high magnification and small size and light weight, and particularly excellent in near-infrared chromatic aberration correction at the wide angle end. Note that as to the inequalities (3) to (9) and (11), among combinations of two or more negative lenses and positive lenses that satisfy the inequalities, a combination showing a value closer to the lower limit is described as a representative value.

However, although it is essential for the zoom lens of the present disclosure to satisfy the inequalities (1) to (4), the inequalities (5) to (12) may not be satisfied. However, if at least one of the inequalities (5) to (12) is satisfied, a better effect can be obtained. This also applies to other embodiments.

Figure 12:
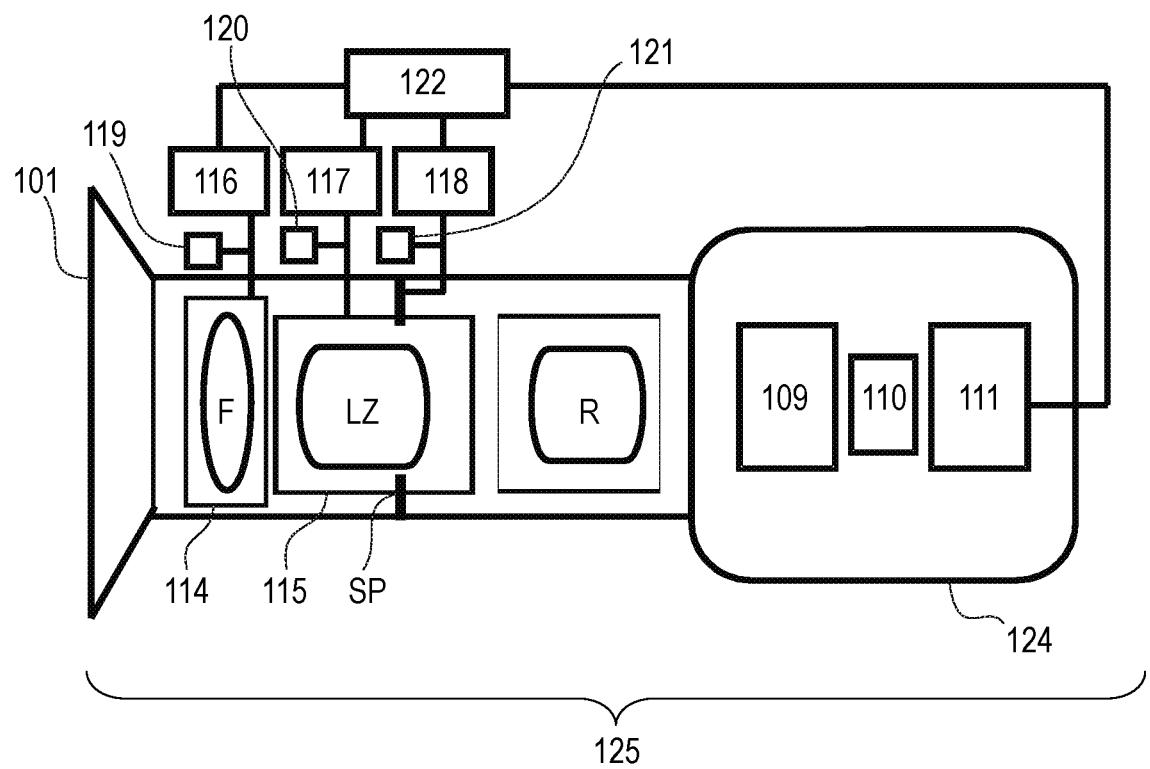
FIG. 12 is a schematic view of a main part of the image pickup apparatus of the present disclosure.

FIG. 12 is a schematic diagram of an image pickup apparatus (television camera system) using the zoom lens of each embodiment as an image pickup optical system.

In FIG. 12, reference numeral 101 denotes the zoom lens of any one of Embodiments 1 to 5. Reference numeral 124 denotes a camera. The zoom lens 101 is detachable from the camera 124. An image pickup apparatus 125 is configured by mounting the zoom lens 101 on a camera 124. The zoom lens 101 includes a first lens unit F, a zoom unit LZ included in the subsequent lens unit, and a rear lens unit R for imaging. The first lens unit F includes a focus lens unit. The zoom unit LZ includes a lens unit that moves on the optical axis for zooming. Reference numeral SP denotes an aperture stop which moves on the optical axis in accordance with zooming.

Reference numerals 114 and 115 denote drive mechanisms such as helicoids and cams that drive the first lens unit F and the zoom unit LZ in the optical axis direction, respectively. Reference numerals 116 to 118 denote motors (drive means) that electrically drive the drive mechanisms 114 and 115 and the aperture stop SP. Reference numerals 119 to 121 denote detectors such as encoders, potentiometers, and photosensors for detecting the positions of the first lens unit F, the zoom portion LZ, and the aperture stop SP on the optical axis and the aperture diameter of the aperture stop SP. In the camera 124, reference numeral 109 denotes a glass block corresponding to an optical filter or a color separation optical system in the camera 124, and reference numeral 110 denotes a solid-state image pickup element (photoelectric conversion element) such as a CCD sensor or a CMOS sensor which receives an object image formed by the zoom lens 101. Reference numerals 111 and 122 denote CPUs that control various types of driving of the camera 124 and the zoom lens 101, respectively.

As described above, by applying the zoom lens of the present disclosure to a television camera, a movie camera, or a digital still camera, an image pickup apparatus having high optical performance is realized.

Embodiment 2

Figure 3:
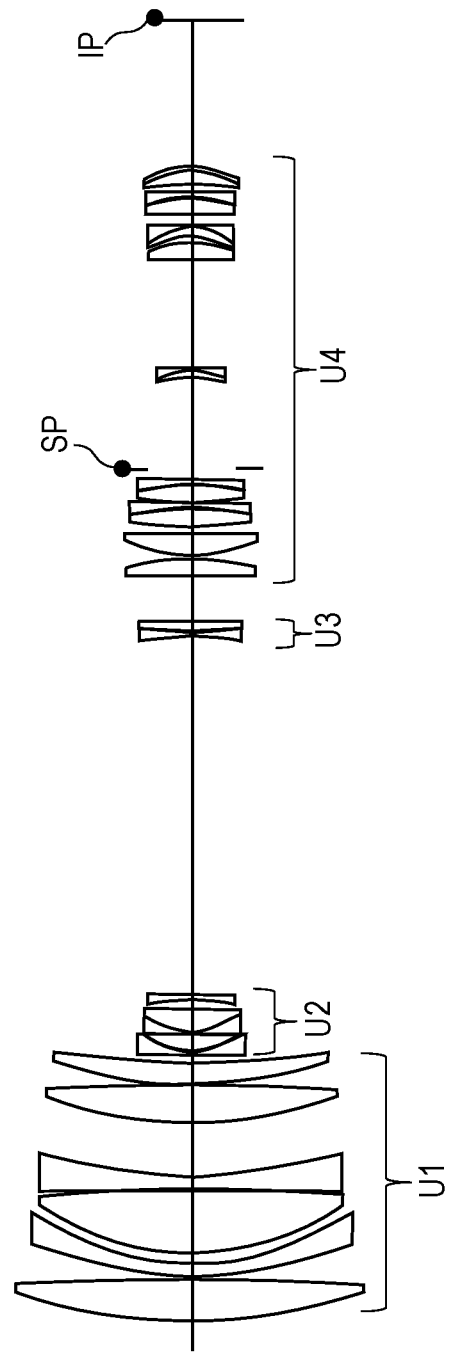
FIG. 3 is a lens cross-sectional view of Numerical Embodiment 2 when focused on the infinity object at the wide angle end.
Figure 4A:
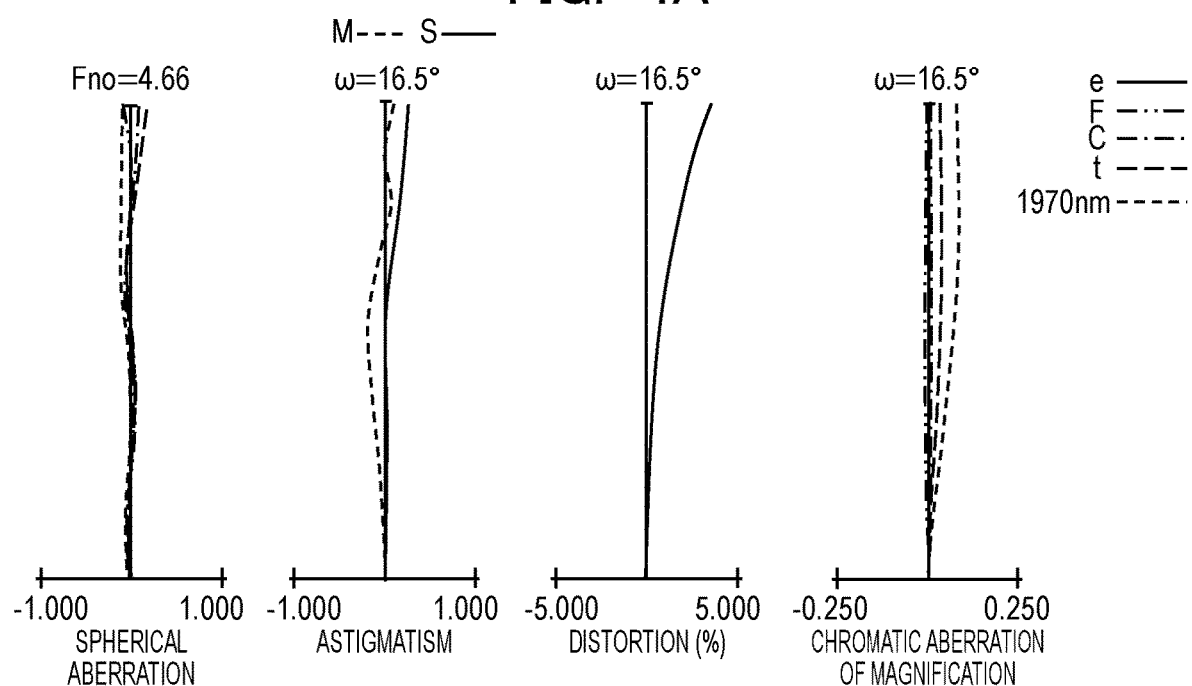
FIG. 4A is an aberration diagram of Numerical Embodiment 2 when focused on the infinity object at the wide angle end.
Figure 4B:
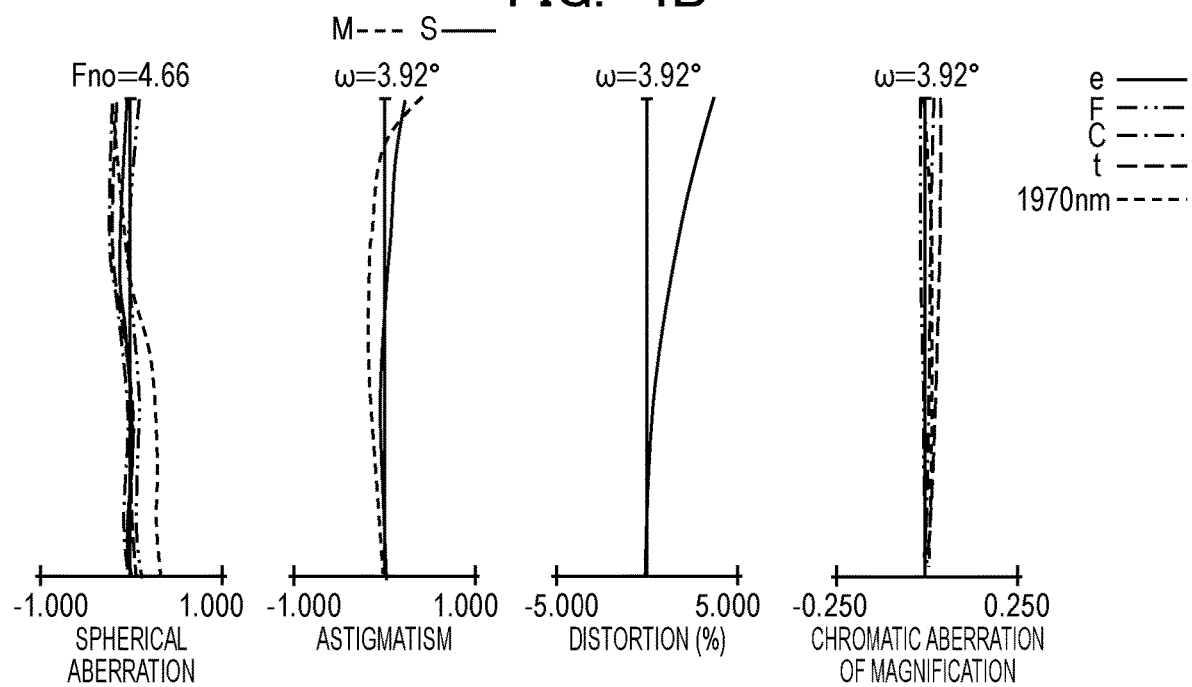
FIG. 4B is an aberration diagram of Numerical Embodiment 2 when focused on the infinity object with a focal length of 215.8 mm.

FIG. 3 is a lens cross-sectional view of a zoom lens according to Embodiment 2 of the present disclosure (Numerical Embodiment 2) when focused on the infinity object at the wide angle end. FIGS. 4A, 4B, and 4C show longitudinal aberration diagrams at the wide angle end, at the focal length of 215.80 mm, and at the telephoto end, respectively, of Numerical Embodiment 2. The aberration diagrams are longitudinal aberration diagrams when focused on the infinity object.

As shown in FIG. 3, the zoom lens includes in order from the object side to the image side, a first lens unit U1 having a positive refractive power for focusing, a second lens unit U2 having a negative refractive power that moves toward the image side for zooming from the wide angle end to the telephoto end, a third lens unit U3 having a positive refractive power that moves non-linearly on the optical axis in conjunction with the movement of the second lens unit U2 to correct an image plane variation due to zooming, a fourth lens unit U4 having positive refractive power and having an imaging function that does not move for zooming. In this embodiment, the second lens unit U2 and the third lens unit U3 constitute a zoom system. The rear lens unit is the fourth lens unit U4. Reference numeral SP denotes an aperture stop, which is disposed in the fourth lens unit U4. IP denotes an image plane.

The first lens unit U1 corresponds to the first to twelfth surfaces. The second lens unit U2 corresponds to the thirteenth to nineteenth surfaces. The third lens unit U3 corresponds to the twentieth to twenty-second surfaces. The fourth lens unit U4 corresponds to the twenty-third to forty-seventh surfaces. The first lens unit U1 includes a first sub lens unit U11 having a positive refractive power that does not move for focusing, and a second sub lens unit U12 having a positive refractive power that moves toward the image side for focusing from the infinity side to the closest side. The first sub lens unit U11 corresponds to the first to eighth surfaces, and the second sub lens unit U12 corresponds to the ninth to twelfth surfaces.

Table 1 shows values corresponding to the respective inequalities of the present embodiment. The present embodiment satisfies the inequalities (1) to (12) as appropriate, and by appropriately setting the chromatic aberration correction and the power arrangement in the rear lens unit, it is possible to achieve a zoom lens which is suitable for a high-magnification zoom lens for monitoring and has high magnification and small size and light weight, and particularly excellent in near-infrared chromatic aberration correction at the wide angle end.

Embodiment 3

FIG. 5 is a lens cross-sectional view of a zoom lens according to Embodiment 3 of the present disclosure (Numerical Embodiment 3) when focused on the infinity object at the wide angle end. FIGS. 6A, 6B, and 6C show longitudinal aberration diagrams at the wide angle end, at the focal length of 131.00 mm, and at the telephoto end, respectively, of Numerical Embodiment 3. The aberration diagrams are longitudinal aberration diagrams when focused on the infinity object.

As shown in FIG. 5, the zoom lens includes in order from the object side to the image side, a first lens unit U1 having a positive refractive power for focusing, a second lens unit U2 having a negative refractive power that moves toward the image side for zooming from the wide angle end to the telephoto end, a third lens unit U3 having a positive refractive power that moves non-linearly on the optical axis in conjunction with the movement of the second lens unit U2 to correct an image plane variation due to zooming, and a fourth lens unit U4 having a positive refractive power and having an imaging function that does not move for zooming. In this embodiment, the second lens unit U2 and the third lens unit U3 constitute a zoom system. The rear lens unit is the fourth lens unit U4. Reference numeral SP denotes an aperture stop, which is disposed in the fourth lens unit U4. IP denotes an image plane.

The first lens unit U1 corresponds to the first to twelfth surfaces. The second lens unit U2 corresponds to the thirteenth to nineteenth surfaces. The third lens unit U3 corresponds to the twentieth to twenty-eighth surfaces. The aperture stop corresponds to the twenty-ninth surface. The fourth lens unit U4 corresponds to the thirtieth to fifty-fourth surfaces. The first lens unit U1 includes a first sub lens unit U11 having a negative refractive power that does not move for focusing, and a second sub lens unit U12 having a positive refractive power that moves toward the image side for focusing from the infinity side to the closest side. The first sub lens unit U11 corresponds to the first to eighth surfaces, and the second sub lens unit U12 corresponds to the ninth to twelfth surfaces.

Table 1 shows values corresponding to the respective inequalities of the present embodiment. The present embodiment satisfies the inequalities (1) to (12) as appropriate, and by appropriately setting the chromatic aberration correction and the power arrangement in the rear lens unit, it is possible to achieve a zoom lens which is suitable for a high-magnification zoom lens for monitoring and has high magnification and small size and light weight, and particularly excellent in near-infrared chromatic aberration correction at the wide angle end.

Embodiment 4

Figure 7:
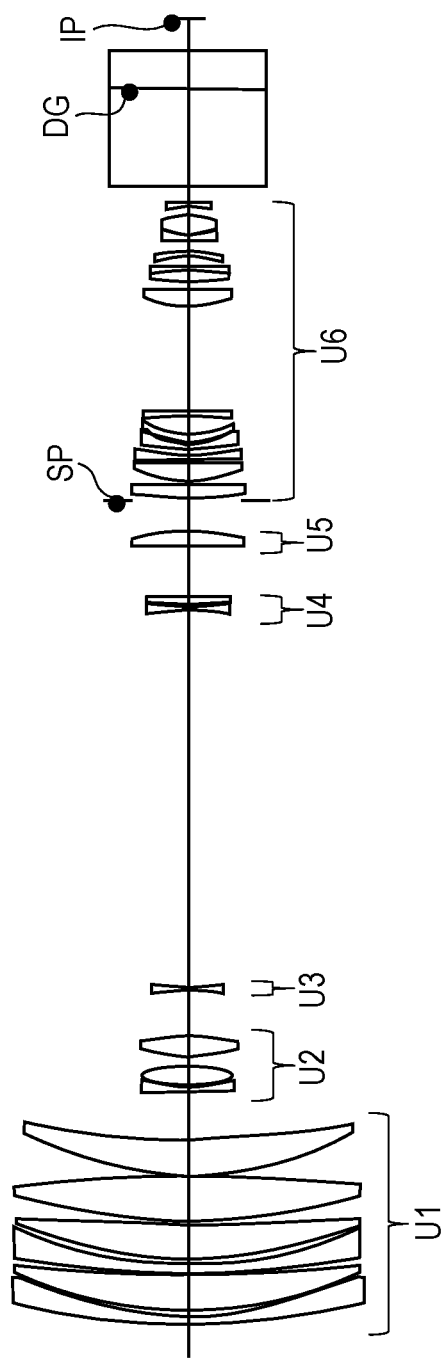
FIG. 7 is a lens cross-sectional view of Numerical Embodiment 4 when focused on the infinity object at the wide angle end.

FIG. 7 is a lens cross-sectional view of a zoom lens according to Embodiment 4 of the present disclosure (Numerical Embodiment 4) when focused on the infinity object at the wide angle end. FIGS. 8A, 8B, and 8C show longitudinal aberration diagrams at the wide angle end, at the focal length of 120.00 mm, and at the telephoto end, respectively, of Numerical Embodiment 4. The aberration diagrams are longitudinal aberration diagrams when focused on the infinity object.

As shown in FIG. 7, the zoom lens includes in order from the object side to the image side, a first lens unit U1 having a positive refractive power for focusing, a second lens unit U2 having a negative refractive power that moves toward the image side for zooming from the wide angle end to the telephoto end, a third lens unit U3 having a negative refractive power that moves during zooming, a fourth lens unit U4 having a positive refractive power that moves during zooming, a fifth lens unit U5 having a positive refractive power that moves non-linearly on the optical axis in conjunction with the movement of the second lens unit U2, the third lens unit U3, and the fourth lens unit U4 and corrects an image plane variation due to zooming, and a sixth lens unit U6 having a positive refractive power and having an imaging function which does not move for zooming. In this embodiment, the second lens unit U2, the third lens unit U3, the fourth lens unit U4, and the fifth lens unit U5 constitute a zoom system. The rear lens unit corresponds to the sixth lens unit U6. Reference numeral SP denotes an aperture stop disposed between the fifth lens unit U5 and the sixth lens unit U6. IP denotes an image plane.

The first lens unit U1 corresponds to the first to twelfth surfaces. The second lens unit U2 corresponds to the thirteenth to eighteenth surfaces. The third lens unit U3 corresponds to the nineteenth to twentieth surfaces. The fourth lens unit U4 corresponds to the twenty-first to twenty-third surfaces. The fifth lens unit U5 corresponds to the twenty-fourth to twenty-fifth surfaces. The aperture stop corresponds to the twenty-sixth surface. The sixth lens unit U6 corresponds to the twenty-seventh to forty-ninth surfaces. The fiftieth to fifty-second surfaces correspond to dummy lens units of the camera optical system. The first lens unit U1 includes a first sub lens unit U11 having a negative refractive power that does not move for focusing, and a second sub lens unit U12 having a positive refractive power that moves toward the image side for focusing from the infinity side to close side. The first sub lens unit U11 corresponds to the first to eighth surfaces, and the second sub lens unit U12 corresponds to the ninth to twelfth surfaces.

Table 1 shows values corresponding to the respective inequalities of the present embodiment. The present embodiment satisfies the inequalities (1) to (12) as appropriate, and by appropriately setting the chromatic aberration correction and the power arrangement in the rear lens unit, it is possible to achieve a zoom lens which is suitable for a high-magnification zoom lens for monitoring and has high magnification and small size and light weight, and particularly excellent in near-infrared chromatic aberration correction at the wide angle end.

Embodiment 5

Figure 10A:
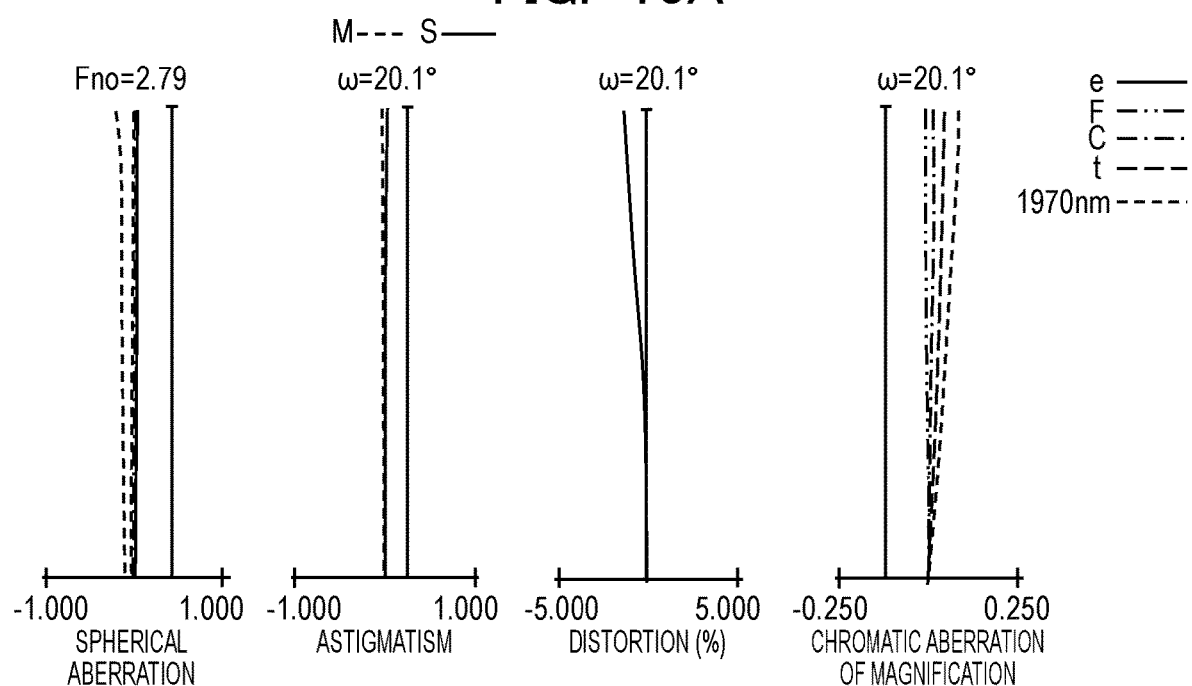
FIG. 10A is an aberration diagram of Numerical Embodiment 5 when focused on the infinity object at the wide angle end.
Figure 10B:
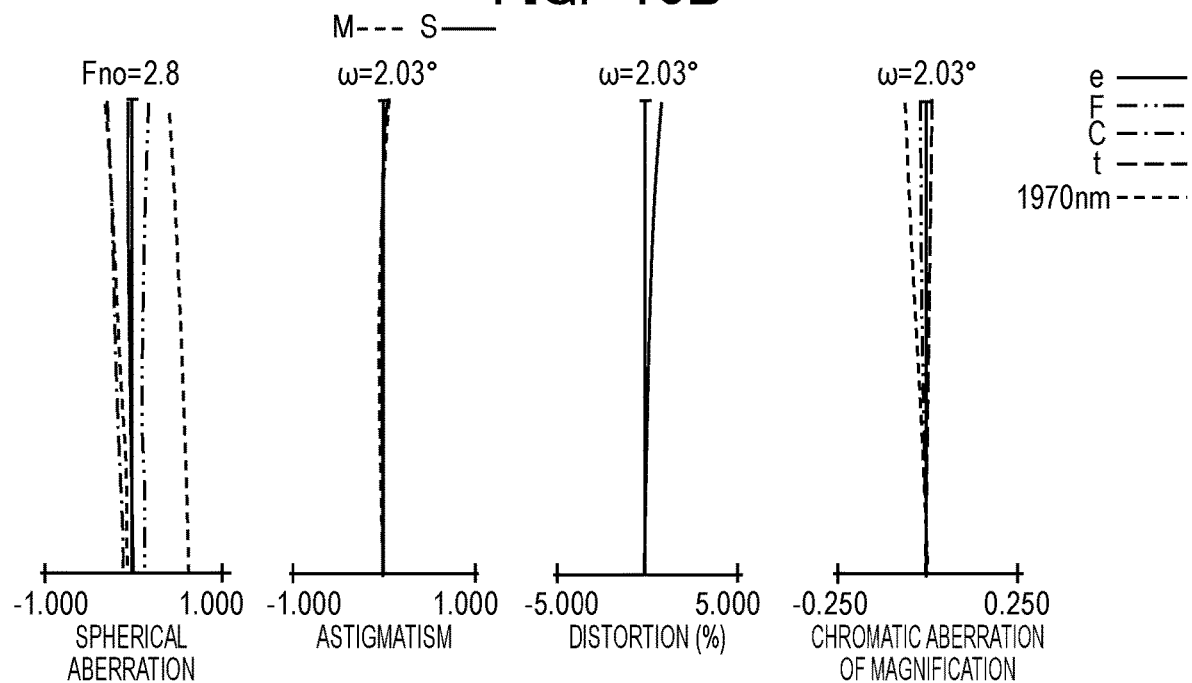
FIG. 10B is an aberration diagram of Numerical Embodiment 5 when focused on the infinity object with a focal length of 155 mm.

FIG. 9 is a lens cross-sectional view of the zoom lens according to Embodiment 5 of the present disclosure (Numerical Embodiment 5) when focused on the infinity object at the wide angle end. FIGS. 10A, 10B, and 10C show longitudinal aberration diagrams at the wide angle end, at the focal length of 154.80 mm, and at the telephoto end, respectively, of Numerical Embodiment 5. The aberration diagrams are longitudinal aberration diagrams when focused on the infinity object.

As shown in FIG. 9, the zoom lens includes in order from the object side to the image side, a first lens unit U1 having a positive refractive power for focusing, a second lens unit U2 having a negative refractive power that moves toward the image side for zooming from the wide angle end to the telephoto end, a third lens unit U3 having a positive refractive power that moves non-linearly on the optical axis in conjunction with the movement of the second lens unit U2 and corrects an image plane variation due to zooming, and a fourth lens unit U4 having a positive refractive power and having an imaging function that does not move for zooming. In this embodiment, the second lens unit U2 and the third lens unit U3 constitute a zoom system. The rear lens unit corresponds to the fourth lens unit U4. Reference numeral SP denotes an aperture stop disposed between the third lens unit U3 and the fourth lens unit U4. IP denotes an image plane.

The first lens unit U1 corresponds to the first to twelfth surfaces. The second lens unit U2 corresponds to the thirteenth to nineteenth surfaces. The third lens unit U3 corresponds to the twentieth to twenty-eighth surfaces. The aperture stop corresponds to the twenty-ninth surface. The fourth lens unit U4 corresponds to the thirtieth to fifty-fourth surfaces. The fifty-fifth to fifty-seventh surfaces correspond to dummy lens units of the camera optical system. The first lens unit U1 includes a first sub lens unit U11 having a negative refractive power that does not move for focusing, and a second sub lens unit U12 having a positive refractive power that moves to the image side for focusing from the infinity side to close side. The first sub lens unit U11 corresponds to the first to eighth surfaces, and the second sub lens unit U12 corresponds to the ninth to twelfth surfaces.

Table 1 shows values corresponding to the respective inequalities of the present embodiment. The present embodiment satisfies the inequalities (1) to (12) as appropriate, and by appropriately setting the chromatic aberration correction and the power arrangement in the rear lens unit, it is possible to achieve a zoom lens which is suitable for a high-magnification zoom lens for monitoring and has high magnification and small size and light weight, and particularly excellent in near-infrared chromatic aberration correction at the wide angle end.

Numerical Embodiment 1

Unit mm
Surface Data

| Surface number | r | d | nd | vd | θs | θt |
|---|---|---|---|---|---|---|
| 1 | 247.138 | 3.00 | 1.85150 | 40.80 | 1.5790 | 0.7390 |
| 2 | 133.165 | 1.26 | | | | |
| 3 | 132.802 | 11.40 | 1.43387 | 95.10 | 1.9585 | 0.8091 |
| 4 | 669.149 | 5.33 | | | | |
| 5 | −2470.405 | 3.00 | 1.51633 | 64.10 | 2.3893 | 0.8687 |
| 6 | 184.859 | 2.78 | | | | |
| 7 | 203.652 | 12.13 | 1.43387 | 95.10 | 1.9585 | 0.8091 |
| 8 | −596.377 | 12.48 | | | | |

-continued

| | | | | | | |
|---|---|---|---|---|---|---|
| 9 | 296.752 | 6.85 | 1.43387 | 95.10 | 1.9585 | 0.8091 |
| 10 | 1283.579 | 0.20 | | | | |
| 11 | 141.890 | 15.62 | 1.43387 | 95.10 | 1.9585 | 0.8091 |
| 12 | −811.464 | 4.13 | | | | |
| 13 | 114.044 | 6.82 | 1.43875 | 94.70 | 2.1296 | 0.8410 |
| 14 | 194.511 (variable) | | | | | |
| 15 | 103.818 | 1.00 | 2.00100 | 29.10 | 1.3159 | 0.6838 |
| 16 | 24.062 | 10.06 | | | | |
| 17 | −34.726 | 0.90 | 1.43875 | 94.90 | 2.1017 | 0.8373 |
| 18 | 49.334 | 1.28 | | | | |
| 19 | 40.427 | 8.15 | 1.85478 | 24.80 | 1.3095 | 0.8739 |
| 20 | −61.575 | (variable) | | | | |
| 21 | −38.262 | 1.10 | 1.65160 | 58.50 | 2.2947 | 0.8525 |
| 22* | 88.021 | (variable) | | | | |
| 23 | −79.009 | 1.00 | 1.81600 | 46.60 | 1.7383 | 0.7690 |
| 24 | 72.870 | 4.34 | 1.85478 | 24.80 | 1.3095 | 0.8739 |
| 25 | −107.623 | 0.86 | | | | |
| 26 | −70.723 | 1.00 | 1.89190 | 37.10 | 1.4800 | 0.7140 |
| 27 | −414.367 | (variable) | | | | |
| 28* | 141.889 | 5.77 | 1.64000 | 60.10 | 2.3803 | 0.8645 |
| 29 | −55.992 | (variable) | | | | |
| 30(Stop) | ∞ | 1.22 | | | | |
| 31 | 113.572 | 3.68 | 1.59522 | 67.70 | 1.8476 | 0.7953 |
| 32 | 214.632 | 0.20 | | | | |
| 33 | 68.348 | 7.64 | 1.49700 | 81.50 | 2.0443 | 0.8258 |
| 34 | −62.345 | 1.30 | 1.80810 | 22.80 | 1.2887 | 0.6596 |
| 35 | 217.090 | 1.94 | | | | |
| 36 | 274.040 | 1.30 | 1.77250 | 49.60 | 1.9229 | 0.7955 |
| 37 | 64.494 | 0.80 | | | | |
| 38 | 43.720 | 4.18 | 1.80810 | 22.80 | 1.2887 | 0.6596 |
| 39 | 73.669 | 5.53 | | | | |
| 40 | 476.847 | 3.30 | 1.88300 | 40.80 | 1.5660 | 0.7397 |
| 41 | −364.853 | 1.99 | | | | |
| 42 | 388.560 | 1.78 | 1.51633 | 64.10 | 2.3901 | 0.7953 |
| 43 | 106.026 | 40.38 | | | | |
| 44 | 67.109 | 5.35 | 1.43875 | 94.90 | 2.1017 | 0.8410 |
| 45 | −47.992 | 0.50 | | | | |
| 46 | 63.062 | 5.90 | 1.43875 | 94.90 | 2.1017 | 0.8410 |
| 47 | −30.033 | 1.20 | 1.64000 | 60.10 | 2.3803 | 0.8645 |
| 48 | 52.050 | 20.00 | | | | |
| 49 | −26.789 | 1.20 | 1.65160 | 58.5 | 2.2947 | 0.8525 |
| 50 | −41.033 | 16.49 | | | | |
| 51 | 44.654 | 1.20 | 1.88300 | 40.8 | 1.566 | 0.7397 |
| 52 | 21.883 | 8.87 | 1.56732 | 42.8 | 1.7442 | 0.7589 |
| 53 | −78.203 | 3.36 | | | | |
| 54 | −35.177 | 4.49 | 1.43875 | 94.9 | 2.1017 | 0.8373 |
| 55 | −19.665 | 1.20 | 1.65160 | 58.5 | 2.2947 | 0.8525 |
| 56 | −24.163 | 4.87 | | | | |
| 57 | ∞ | 33.00 | 1.60859 | 46.4 | 1.8423 | 0.7750 |
| 58 | ∞ | 13.20 | 1.51680 | 64.2 | 2.3351 | 0.8687 |
| 59 | ∞ | 8.10 | | | | |
| Image plane | ∞ | | | | | |

Aspherical surface data

The twenty-second surface $K = 0.00000e+00$ $A4 = -1.27407e-06$ $A6 = 8.94995e-10$ $A8 = 2.30993e-11$
$A10 = 7.95369e-14$ $A12 = -9.12510e-16$ The twenty-eighth surface $K = -5.07198e+00$ $A4 = -8.97124e-07$ $A6 = 1.59409e-10$ $A8 = -7.09152e-13$
$A10 = 1.86675e-15$ $A12 = -2.09687e-18$ Various data Zoom ratio 43.60

| | Wide angle end | Middle | Telephoto end |
|---|---|---|---|
| Focal length | 14.00 | 93.40 | 610.50 |
| F-number | 2.87 | 2.89 | 5.63 |
| Half angle of view | 21.45 | 3.37 | 0.52 |
| Total lens length | 472.53 | 472.53 | 472.53 |
| BF | 8.10 | 8.10 | 8.10 |
| d14 | 3.49 | 93.70 | 124.58 |
| d20 | 4.79 | 5.91 | 7.11 |
| d22 | 127.79 | 9.14 | 10.74 |

-continued

| | | | | |
|---|---|---|---|---|
| d27 | 7.63 | 28.49 | | 1.00 |
| d29 | 4.21 | 10.66 | | 4.47 |
| Entrance pupil position | 106.09 | 598.79 | | 2778.15 |
| Exit pupil position | 197.65 | 197.65 | | 197.65 |
| Front principal point position | 121.12 | 738.22 | | 5354.97 |
| Rear principal point position | −5.90 | −85.30 | | −602.41 |

Zoom lens unit data

| Unit | Leading surface | Focal length | Lens structure length | Front principal point position | Rear principal point position |
|---|---|---|---|---|---|
| 1 | 1 | 167.06 | 85.00 | 52.1 | −13.54 |
| 2 | 15 | −118.28 | 21.39 | −31.2 | −66.01 |
| 3 | 21 | −40.62 | 1.10 | 0.2 | −0.46 |
| 4 | 23 | −80.86 | 7.20 | 1.18 | −3.04 |
| 5 | 28 | 63.20 | 5.77 | 2.55 | −1.00 |
| 6 | 30 | 96.58 | 196.06 | 148.61 | −78.23 |

Single lens data

| Lens | Leading surface | Focal length |
|---|---|---|
| 1 | 1 | −341.29 |
| 2 | 3 | 378.48 |
| 3 | 5 | −331.74 |
| 4 | 7 | 350.63 |
| 5 | 9 | 885.55 |
| 6 | 11 | 279.05 |
| 7 | 13 | 610.93 |
| 8 | 15 | −31.23 |
| 9 | 17 | −46.18 |
| 10 | 19 | 29.37 |
| 11 | 21 | −40.62 |
| 12 | 23 | −46.08 |
| 13 | 24 | 50.92 |
| 14 | 26 | −95.14 |
| 15 | 28 | 63.20 |
| 16 | 31 | 398.39 |
| 17 | 33 | 66.71 |
| 18 | 34 | −59.20 |
| 19 | 36 | −108.96 |
| 20 | 38 | 123.95 |
| 21 | 40 | 233.16 |
| 22 | 42 | −281.96 |
| 23 | 44 | 64.53 |
| 24 | 46 | 47.17 |
| 25 | 47 | −29.47 |
| 26 | 49 | −122.03 |
| 27 | 51 | −49.55 |
| 28 | 52 | 30.97 |
| 29 | 54 | 93.14 |
| 30 | 55 | −180.48 |
| 31 | 57 | 0.00 |
| 32 | 58 | 0.00 |

Numerical Embodiment 2

Unit mm
Surface Data

| Surface number | r | d | nd | vd | θs | θt |
|---|---|---|---|---|---|---|
| 1 | 204.747 | 14.36 | 1.48749 | 70.2 | 2.5490 | 0.8924 |
| 2 | −636.913 | 1.00 | | | | |
| 3 | 141.341 | 3.70 | 1.77250 | 49.6 | 1.9229 | 0.7955 |
| 4 | 95.018 | 4.09 | | | | |
| 5 | 92.999 | 22.20 | 1.43387 | 95.1 | 1.9585 | 0.8091 |
| 6 | −593.374 | 1.50 | | | | |
| 7 | −385.860 | 3.20 | 1.72916 | 54.7 | 2.1057 | 0.8244 |
| 8 | 168.863 | 19.04 | | | | |
| 9 | 148.673 | 13.30 | 1.43387 | 95.1 | 1.9585 | 0.8091 |
| 10 | −588.610 | 0.15 | | | | |

-continued

| | | | | | | |
|---|---|---|---|---|---|---|
| 11 | 164.597 | 7.00 | 1.43875 | 94.9 | 2.1017 | 0.8373 |
| 12 | 324.962 | (variable) | | | | |
| 13 | 25961.799 | 1.20 | 1.61800 | 63.3 | 1.9662 | 0.8194 |
| 14 | 26.724 | 5.73 | | | | |
| 15 | 278.486 | 1.00 | 1.59522 | 67.7 | 1.8476 | 0.7953 |
| 16 | 25.808 | 8.36 | 1.72047 | 34.7 | 1.5610 | 0.7267 |
| 17 | −212.609 | 3.69 | | | | |
| 18 | −52.427 | 1.00 | 1.62041 | 60.3 | 2.1215 | 0.8291 |
| 19* | 316.610 | (variable) | | | | |
| 20 | −70.751 | 1.15 | 1.71700 | 47.9 | 1.7072 | 0.7629 |
| 21 | 67.832 | 4.23 | 1.80810 | 22.8 | 1.2887 | 0.6596 |
| 22 | 519.661 | (variable) | | | | |
| 23* | 157.672 | 7.34 | 1.49700 | 81.5 | 2.0443 | 0.8258 |
| 24 | −83.727 | 0.20 | | | | |
| 25 | 44.980 | 9.90 | 1.59522 | 67.7 | 1.8476 | 0.7653 |
| 26 | −140.909 | 0.61 | | | | |
| 27 | 95.492 | 6.96 | 1.49700 | 81.5 | 2.0443 | 0.8258 |
| 28 | −65.697 | 1.00 | 1.64000 | 60.1 | 2.3803 | 0.8645 |
| 29 | 379.038 | 0.50 | | | | |
| 30 | 119.366 | 6.29 | 1.43875 | 94.9 | 2.1017 | 0.8410 |
| 31 | −77.735 | 1.20 | 2.00100 | 29.1 | 1.3159 | 0.6838 |
| 32 | 126.986 | 4.06 | | | | |
| 33(Stop) | ∞ | 32.49 | | | | |
| 34 | −29.774 | 2.25 | 1.59522 | 67.7 | 1.8476 | 0.7953 |
| 35 | −22.040 | 1.20 | 1.64000 | 60.1 | 2.3803 | 0.8645 |
| 36 | −56.192 | 37.35 | | | | |
| 37 | 1798.372 | 6.80 | 1.58144 | 40.8 | 1.7446 | 0.7500 |
| 38 | −27.738 | 1.84 | | | | |
| 39 | −25.849 | 2.84 | 1.49700 | 81.5 | 2.0443 | 0.8258 |
| 40 | −21.205 | 1.20 | 1.64000 | 60.1 | 2.3803 | 0.8645 |
| 41 | −140.090 | 3.00 | | | | |
| 42 | 145.064 | 7.68 | 1.68893 | 31.1 | 1.4380 | 0.6995 |
| 43 | −27.983 | 1.20 | 2.00100 | 29.1 | 1.3159 | 0.6838 |
| 44 | −626.893 | 2.43 | | | | |
| 45 | −62.536 | 4.20 | 1.80518 | 25.4 | 1.2802 | 0.6680 |
| 46 | −30.329 | 1.20 | 1.95906 | 17.5 | 1.1610 | 0.6264 |
| 47 | −34.458 | 52.00 | | | | |
| Image plane | ∞ | | | | | |

Aspherical surface data

The nineteenth surface

K = −1.15564e+02 A 4 = −3.55965e−06 A 6 = −1.12271e−07 A 8 = −5.29940e−09
A10 = −2.21323e−11 A12 = 3.15317e−13 A14 = 2.53426e−16
A 3 = −1.15915e+07 A 5 = 2.92916e−07 A 7 = 2.88344e−08 A 9 = 2.78631e−10
A11 = −2.23335e−12 A13 = −1.47760e14

The twenty-third surface

K = −1.37989e+02 A 4 = 1.07833e−06 A 6 = −1.21967e−07 A 8 = −7.11545e−10
A10 = −1.68143e−12 A12 = −1.52419e−15 A14 = −2.12777e−9
A 3 = 4.12526e−06 A 5 = 7.03155e−07 A7 = 1.09923e−08 A 9 = 3.76626e−11
A11 = 5.94565e−14 A13 = 2.55061e−17

Various data

Zoom ratio 19.20

| | Wide angle end | Middle | Telephoto end |
|---|---|---|---|
| Focal length | 50.00 | 215.80 | 960.00 |
| F-number | 4.66 | 4.66 | 8.32 |
| Half angle of view | 16.49 | 3.92 | 0.88 |
| Total lens length | 454.50 | 454.50 | 454.50 |
| BF | 52.00 | 52.00 | 52.00 |
| d12 | 2.87 | 89.38 | 127.53 |
| d19 | 124.82 | 64.50 | 4.30 |
| d22 | 15.19 | 29.03 | 1.13 |

Zoom lens unit data

| Unit | Leading surface | Focal length | Lens structure length | Front principal point position | Rear principal point position |
|---|---|---|---|---|---|
| 1 | 1 | 215.83 | 89.33 | 31.09 | −44.81 |
| 2 | 13 | −35.23 | 20.90 | 4.88 | −9.72 |

-continued

| | | | | | |
|---|---|---|---|---|---|
| 3 | 20 | −95.95 | 5.32 | 0.36 | −2.60 |
| 4 | 23 | 87.12 | 144.34 | 42.56 | −245.50 |

Single lens data

| Lens | Leading surface | Focal length |
|---|---|---|
| 1 | 1 | 320.90 |
| 2 | 3 | −383.29 |
| 3 | 5 | 183.83 |
| 4 | 7 | −161.84 |
| 5 | 9 | 281.51 |
| 6 | 11 | 751.12 |
| 7 | 13 | −43.27 |
| 8 | 15 | −47.22 |
| 9 | 16 | 32.35 |
| 10 | 18 | −73.69 |
| 11 | 20 | −48.17 |
| 12 | 21 | 96.71 |
| 13 | 23 | 113.94 |
| 14 | 25 | 57.75 |
| 15 | 27 | 76.99 |
| 16 | 28 | −82.72 |
| 17 | 30 | 108.61 |
| 18 | 31 | −48.81 |
| 19 | 34 | 131.11 |
| 20 | 35 | −56.09 |
| 21 | 37 | 46.40 |
| 22 | 39 | 193.93 |
| 23 | 40 | −39.21 |
| 24 | 42 | 33.79 |
| 25 | 43 | −28.46 |
| 26 | 45 | 65.49 |
| 27 | 46 | −263.02 |

Numerical Embodiment 3

Unit mm
Surface Data

| Surface number | r | d | nd | vd | θs | θt |
|---|---|---|---|---|---|---|
| 1 | 682.120 | 6.00 | 1.65100 | 56.2 | 2.1701 | 0.8345 |
| 2 | 349.658 | 0.69 | | | | |
| 3 | 311.309 | 24.40 | 1.43387 | 95.1 | 1.9585 | 0.8091 |
| 4 | −1141.080 | 1.08 | | | | |
| 5 | 593.873 | 6.00 | 1.65412 | 39.7 | 1.7312 | 0.7554 |
| 6 | 221.900 | 1.13 | | | | |
| 7 | 227.284 | 24.79 | 1.43387 | 95.1 | 1.9585 | 0.8091 |
| 8 | 4587.883 | 27.40 | | | | |
| 9 | 354.382 | 11.97 | 1.43387 | 95.1 | 1.9585 | 0.8091 |
| 10 | 1027.840 | 7.36 | | | | |
| 11 | 163.661 | 20.78 | 1.49700 | 81.5 | 2.0443 | 0.8258 |
| 12 | 435.326 | (variable) | | | | |
| 13* | 18073.629 | 2.20 | 2.00330 | 28.3 | 1.3128 | 0.6842 |
| 14 | 38.948 | 10.71 | | | | |
| 15 | −49.833 | 1.45 | 1.78800 | 47.4 | 1.8521 | 0.7837 |
| 16 | 65.375 | 9.79 | 1.92286 | 18.9 | 1.1923 | 0.6365 |
| 17 | −73.963 | 2.43 | | | | |
| 18 | −47.115 | 2.00 | 1.65412 | 39.7 | 1.7312 | 0.7554 |
| 19 | −91.990 | (variable) | | | | |
| 20 | 108.145 | 13.98 | 1.59522 | 67.7 | 1.8476 | 0.7953 |
| 21* | −405.597 | 0.50 | | | | |
| 22 | 122.302 | 13.07 | 1.59522 | 67.7 | 1.8476 | 0.7953 |
| 23 | −427.633 | 0.20 | | | | |
| 24 | 188.006 | 2.50 | 1.80518 | 25.4 | 1.2802 | 0.6680 |
| 25 | 58.257 | 19.05 | 1.49700 | 81.5 | 2.0443 | 0.8258 |
| 26 | −5572.127 | 0.50 | | | | |
| 27 | 468.507 | 6.40 | 1.59522 | 67.7 | 1.8476 | 0.7953 |
| 28* | −348.612 | (variable) | | | | |
| 29(Stop) | ∞ | 4.87 | | | | |
| 30 | −202.173 | 1.40 | 1.88300 | 40.8 | 1.5660 | 0.7397 |
| 31 | 52.889 | 1.24 | | | | |

-continued

| | | | | | | |
|---|---|---|---|---|---|---|
| 32 | 38.100 | 4.67 | 1.80810 | 22.8 | 1.2887 | 0.6596 |
| 33 | 255.029 | 4.05 | | | | |
| 34 | −81.247 | 1.40 | 1.81600 | 46.6 | 1.7383 | 0.7690 |
| 35 | 120.494 | 4.26 | | | | |
| 36 | 43.554 | 2.11 | 1.59522 | 67.7 | 1.8476 | 0.7953 |
| 37 | 54.033 | 7.76 | | | | |
| 38 | −55.739 | 1.20 | 1.95906 | 17.5 | 1.1610 | 0.6264 |
| 39 | −47.708 | 4.90 | | | | |
| 40 | −49.090 | 3.19 | 1.49700 | 81.5 | 2.0443 | 0.8258 |
| 41 | −29.737 | 4.38 | | | | |
| 42 | −40.964 | 1.20 | 1.64000 | 60.1 | 2.3803 | 0.8645 |
| 43 | −1448.450 | 7.29 | | | | |
| 44 | 189.447 | 3.25 | 1.59522 | 67.7 | 1.8476 | 0.7953 |
| 45 | −49.047 | 1.20 | 1.64000 | 60.1 | 2.3803 | 0.8645 |
| 46 | 70.373 | 3.80 | | | | |
| 47 | 1607.246 | 5.50 | 1.48749 | 70.2 | 2.5490 | 0.8924 |
| 48 | −18.187 | 1.20 | 1.65160 | 58.5 | 2.2947 | 0.8525 |
| 49 | −39.949 | 0.88 | | | | |
| 50 | −1526.927 | 5.04 | 1.59522 | 67.7 | 1.8476 | 0.7953 |
| 51 | −21.552 | 1.20 | 1.64000 | 60.1 | 2.3803 | 0.8645 |
| 52 | −128.912 | 0.04 | | | | |
| 53 | 46.971 | 4.09 | 1.48749 | 70.2 | 2.549 | 0.8924 |
| 54 | −78.289 | 10.00 | | | | |
| 55 | ∞ | 33.00 | 1.60859 | 46.4 | 1.8423 | 0.7750 |
| 56 | ∞ | 13.20 | 1.51680 | 64.2 | 2.3351 | 0.8687 |
| 57 | ∞ | 13.85 | | | | |
| Image plane | ∞ | | | | | |

Aspherical surface data

The thirteenth surface

K = 0.00000e+00 A 4 = 7.47758e−07 A 6 = 9.29456e−09 A 8 = 2.21240e−10
A10 = 1.75675e−12 A12 = 5.18281e−15 A14 = 3.78662e−18 A16 = 3.15661e−22
A 3 = 3.04852e−07 A 5 = −2.28681e−08 A 7 = −1.75909e−09 A 9 = −2.18764e−11
A11 = −1.10726e−13 A13 = −1.71256e−16 A15 = −5.08309e−20

The twenty-first surface

K = 0.00000e+00 A 4 = 2.26284e−07 A 6 = −1.92133e−11 A 8 = 8.65737e−14
A10 = −9.68992e−17 A12 = 2.63049e−20 A14 = 1.48323e−25 A16 = 5.54447e−27
A 3 = −1.41344e−07 A 5 = 8.13212e−10 A 7 = −1.39508e−12 A 9 = 3.33879e−16
A11 = 1.30310e−18 A13 = −3.70836e−22 A15 = −3.24743e−25

The twenty-eighth surface

K = 0.00000e+00 A 4 = 5.46711e−07 A 6 = 7.38787e−09 A 8 = 1.45148e−11
A10 = −1.16264e−14 A12 = 1.20199e−17 A14 = −2.51373e−20 A16 = −4.23103e−24
A 3 = 9.89211e−09 A 5 = −5.88461e−08 A 7 = −4.82342e−10 A 9 = 3.61333e−14
A11 = −5.51003e−17 A13 = 2.11899e−19 A15 = 5.65576e−22

Various data

Zoom ratio 92.10

| | Wide angle end | Middle | Telephoto end |
|---|---|---|---|
| Focal length | 12.80 | 131.00 | 1175.20 |
| F-number | 2.44 | 2.44 | 5.81 |
| Half angle of view | 23.32 | 2.40 | 0.27 |
| Total lens length | 669.69 | 669.69 | 669.69 |
| BF | 13.85 | 13.85 | 13.85 |
| d12 | 18.53 | 168.53 | 204.82 |
| d19 | 281.61 | 102.00 | −5.56 |
| d28 | 3.00 | 32.61 | 103.88 |
| Entrance pupil position | 193.30 | 1430.24 | 14723.23 |
| Exit pupil position | 281.86 | 281.86 | 281.86 |
| Front principal point position | 206.66 | 1625.36 | 21051.56 |
| Rear principal point position | 1.09 | −117.19 | −1161.35 |

Zoom lens unit data

| Unit | Leading surface | Focal length | Lens structure length | Front principal point position | Rear principal point position |
|---|---|---|---|---|---|
| 1 | 1 | 293.10 | 131.60 | 61.61 | −42.93 |
| 2 | 13 | −29.05 | 28.58 | 2.50 | −18.83 |
| 3 | 20 | 71.76 | 56.20 | 11.33 | −27.36 |
| 4 | 29 | 53.21 | 136.32 | 66.87 | 21.40 |

-continued

| Single lens data | | |
|---|---|---|
| Lens | Leading surface | Focal length |
| 1 | 1 | −1105.23 |
| 2 | 3 | 565.19 |
| 3 | 5 | −541.86 |
| 4 | 7 | 548.83 |
| 5 | 9 | 1236.82 |
| 6 | 11 | 513.08 |
| 7 | 13 | −38.58 |
| 8 | 15 | −35.51 |
| 9 | 16 | 38.45 |
| 10 | 18 | −149.42 |
| 11 | 20 | 144.41 |
| 12 | 22 | 160.64 |
| 13 | 24 | −104.78 |
| 14 | 25 | 115.80 |
| 15 | 27 | 335.62 |
| 16 | 30 | −47.08 |
| 17 | 32 | 54.34 |
| 18 | 34 | −58.98 |
| 19 | 36 | 349.60 |
| 20 | 38 | 477.88 |
| 21 | 40 | 143.46 |
| 22 | 42 | −65.63 |
| 23 | 44 | 65.56 |
| 24 | 45 | −44.81 |
| 25 | 47 | 36.81 |
| 26 | 48 | −52.16 |
| 27 | 50 | 36.55 |
| 28 | 51 | −40.45 |
| 29 | 53 | 60.67 |
| 30 | 55 | 0.00 |
| 31 | 56 | 0.00 |

Numerical Embodiment 4

| Unit mm Surface Data | | | | | | |
|---|---|---|---|---|---|---|
| Surface number | r | d | nd | vd | θs | θt |
| 1 | 245.391 | 3.00 | 1.85150 | 40.80 | 1.5790 | 0.7392 |
| 2 | 130.602 | 0.59 | | | | |
| 3 | 124.136 | 12.30 | 1.43387 | 95.10 | 1.9585 | 0.8091 |
| 4 | 457.274 | 0.50 | | | | |
| 5 | 269.236 | 3.00 | 1.51633 | 64.10 | 2.3901 | 0.8687 |
| 6 | 131.716 | 2.45 | | | | |
| 7 | 142.838 | 11.71 | 1.43387 | 95.10 | 1.9585 | 0.8091 |
| 8 | 770.032 | 12.82 | | | | |
| 9 | 185.207 | 15.23 | 1.43387 | 95.10 | 1.9585 | 0.8091 |
| 10 | −463.061 | 0.20 | | | | |
| 11 | 109.059 | 11.72 | 1.43387 | 95.10 | 1.9585 | 0.8091 |
| 12 | 273.810 | (variable) | | | | |
| 13 | 400.000 | 1.00 | 2.00100 | 29.10 | 1.3159 | 0.6838 |
| 14 | 27.103 | 8.22 | | | | |
| 15 | −37.144 | 0.90 | 1.51633 | 64.10 | 2.3901 | 0.8687 |
| 16 | −65.161 | 2.00 | | | | |
| 17 | 52.734 | 6.50 | 1.85478 | 24.80 | 1.3095 | 0.6739 |
| 18 | −63.260 | (variable) | | | | |
| 19 | −40.431 | 1.10 | 1.65160 | 58.50 | 2.2947 | 0.8525 |
| 20* | 48.323 | (variable) | | | | |
| 21 | −54.438 | 1.00 | 1.81600 | 46.60 | 1.7383 | 0.7690 |
| 22 | 54.335 | 3.46 | 1.85478 | 24.80 | 1.3095 | 0.6739 |
| 23 | −1420.139 | (variable) | | | | |
| 24* | 173.613 | 5.61 | 1.59522 | 67.70 | 1.8476 | 0.7953 |
| 25 | −55.992 | (variable) | | | | |
| 26(Stop) | ∞ | 1.22 | | | | |
| 27 | 135.204 | 4.85 | 1.49700 | 81.50 | 2.0443 | 0.8258 |
| 28 | −239.235 | 0.20 | | | | |
| 29 | 36.194 | 7.99 | 1.59522 | 67.70 | 1.8476 | 0.7953 |
| 30 | −209.938 | 1.30 | 1.80810 | 22.80 | 1.2887 | 0.6596 |

-continued

| | | | | | | |
|---|---|---|---|---|---|---|
| 31 | 86.146 | 1.94 | | | | |
| 32 | 90.271 | 1.30 | 1.69680 | 55.50 | 2.1665 | 0.8330 |
| 33 | 28.392 | 0.80 | | | | |
| 34 | 28.097 | 2.75 | 1.65412 | 39.70 | 1.7312 | 0.7554 |
| 35 | 34.047 | 5.53 | | | | |
| 36 | −146.752 | 1.80 | 1.65160 | 58.50 | 2.2947 | 0.8525 |
| 37 | −872.689 | 35.00 | | | | |
| 38 | 32.013 | 6.91 | 1.59522 | 67.70 | 1.8476 | 0.7953 |
| 39 | −103.038 | 2.02 | | | | |
| 40 | 89.675 | 3.54 | 1.43875 | 94.90 | 2.1017 | 0.8410 |
| 41 | −74.766 | 1.20 | 1.64000 | 60.10 | 2.3803 | 0.8645 |
| 42 | −2576.591 | 3.82 | | | | |
| 43 | −26.593 | 1.20 | 1.65160 | 58.50 | 2.2947 | 0.8525 |
| 44 | −43.007 | 4.13 | | | | |
| 45 | −145.035 | 1.20 | 1.88300 | 40.80 | 1.5660 | 0.7397 |
| 46 | 16.882 | 6.92 | 1.56732 | 42.80 | 1.7442 | 0.7589 |
| 47 | −17.782 | 3.00 | | | | |
| 48 | −20.322 | 1.20 | 1.65160 | 58.50 | 2.2947 | 0.8525 |
| 49 | −140.037 | 4.87 | | | | |
| 50 | ∞ | 33.00 | 1.60859 | 46.40 | 1.8423 | 0.7750 |
| 51 | ∞ | 13.20 | 1.51680 | 64.20 | 2.3351 | 0.8687 |
| 52 | ∞ | 10.00 | | | | |
| Image plane | ∞ | | | | | |

Aspherical surface data

The twentieth surface $K = 0.00000e+00$ $A4 = -3.95154e-06$ $A6 = -3.50703e-08$ $A8 = 5.02922e-10$
$A10 = -3.39674e-12$ $A12 = 8.83762e-15$ The twenty-fourth surface $K = -5.07198e+00$ $A4 = -8.38686e-07$ $A6 = 2.41407e-09$ $A8 = -1.50165e-11$
$A10 = 4.40195e-14$ $A12 = -4.74850e-17$ Various data Zoom ratio 44.50

| | Wide angle end | Middle | Telephoto end |
|---|---|---|---|
| Focal length | 18.00 | 120.00 | 800.00 |
| F-number | 3.50 | 3.50 | 7.00 |
| Half angle of view | 17.01 | 2.62 | 0.39 |
| Total lens length | 436.07 | 436.07 | 436.07 |
| BF | 10.00 | 10.00 | 10.00 |
| d12 | 4.13 | 94.35 | 125.23 |
| d18 | 15.19 | 16.32 | 17.52 |
| d20 | 126.26 | 11.57 | 18.04 |
| d23 | 16.46 | 33.36 | 0.99 |
| d25 | 9.81 | 16.25 | 10.07 |
| Entrance pupil position | 111.33 | 660.44 | 3332.70 |
| Exit pupil position | −90.64 | −90.64 | −90.64 |
| Front principal point position | 126.09 | 637.35 | −2226.35 |
| Rear principal point position | −7.98 | −110.00 | −790.00 |

Zoom lens unit data

| Unit | Leading surface | Focal length | Lens structure length | Front principal point position | Rear principal point position |
|---|---|---|---|---|---|
| 1 | 1 | 177.02 | 73.52 | 39.83 | −16.34 |
| 2 | 13 | 1280.28 | 18.63 | 417.22 | 597.05 |
| 3 | 19 | −33.48 | 1.10 | 0.30 | −0.36 |
| 4 | 21 | −73.29 | 4.46 | −0.14 | −2.55 |
| 5 | 24 | 71.53 | 5.61 | 2.68 | −0.86 |
| 6 | 26 | 128.96 | 150.90 | −31.75 | −116.12 |

Single lens data

| Lens | Leading surface | Focal length |
|---|---|---|
| 1 | 1 | −329.97 |
| 2 | 3 | 387.41 |
| 3 | 5 | −501.32 |
| 4 | 7 | 400.91 |
| 5 | 9 | 306.33 |

-continued

| | | |
|---|---|---|
| 6 | 11 | 407.91 |
| 7 | 13 | −28.85 |
| 8 | 15 | −168.54 |
| 9 | 17 | 34.22 |
| 10 | 19 | −33.48 |
| 11 | 21 | −33.02 |
| 12 | 22 | 60.71 |
| 13 | 24 | 71.53 |
| 14 | 27 | 174.05 |
| 15 | 29 | 52.32 |
| 16 | 30 | −74.67 |
| 17 | 32 | −59.70 |
| 18 | 34 | 206.46 |
| 19 | 36 | −269.91 |
| 20 | 38 | 41.69 |
| 21 | 40 | 93.31 |
| 22 | 41 | −119.86 |
| 23 | 43 | −109.67 |
| 24 | 45 | −16.97 |
| 25 | 46 | 16.37 |
| 26 | 48 | −36.48 |
| 27 | 50 | 0.00 |
| 28 | 51 | 0.00 |

Numerical Embodiment 5

Unit mm
Surface Data

| Surface number | r | d | nd | vd | θs | θt |
|---|---|---|---|---|---|---|
| 1 | 600.879 | 6.00 | 1.64000 | 60.1 | 2.3803 | 0.8645 |
| 2 | 333.619 | 0.50 | | | | |
| 3 | 311.805 | 28.32 | 1.43387 | 95.1 | 1.9585 | 0.8091 |
| 4 | −801.556 | 1.00 | | | | |
| 5 | 516.417 | 6.00 | 1.65412 | 39.7 | 1.7312 | 0.7554 |
| 6 | 213.809 | 0.56 | | | | |
| 7 | 214.295 | 23.19 | 1.43387 | 95.1 | 1.9585 | 0.8091 |
| 8 | 1088.271 | 26.62 | | | | |
| 9 | 261.421 | 16.51 | 1.43387 | 95.1 | 1.9585 | 0.8091 |
| 10 | 978.660 | 5.24 | | | | |
| 11 | 168.688 | 17.83 | 1.49700 | 81.5 | 2.0443 | 0.8258 |
| 12 | 373.075 | (variable) | | | | |
| 13* | 18073.629 | 2.00 | 2.00330 | 28.3 | 1.3128 | 0.6842 |
| 14 | 43.149 | 12.00 | | | | |
| 15 | −37.880 | 1.40 | 1.78800 | 47.4 | 1.8521 | 0.7837 |
| 16 | −2068.503 | 9.70 | 1.95906 | 17.5 | 1.1610 | 0.6264 |
| 17 | −51.340 | 1.20 | | | | |
| 18 | −56.568 | 2.00 | 1.77250 | 49.6 | 1.9229 | 0.7955 |
| 19 | −212.324 | (variable) | | | | |
| 20 | 100.457 | 14.00 | 1.59522 | 67.7 | 1.8476 | 0.7953 |
| 21* | −405.597 | 0.50 | | | | |
| 22 | 135.729 | 12.00 | 1.59522 | 67.7 | 1.8476 | 0.7953 |
| 23 | −846.967 | 0.20 | | | | |
| 24 | 257.076 | 2.50 | 1.85478 | 24.8 | 1.3095 | 0.6739 |
| 25 | 64.828 | 18.00 | 1.59522 | 67.7 | 1.8476 | 0.7953 |
| 26 | −686.442 | 0.50 | | | | |
| 27 | 303.751 | 6.50 | 1.59522 | 67.7 | 1.8476 | 0.7953 |
| 28* | −800.000 | (variable) | | | | |
| 29(Stop) | ∞ | 4.87 | | | | |
| 30 | −433.158 | 1.40 | 1.88300 | 40.8 | 1.5660 | 0.7397 |
| 31 | 58.721 | 1.24 | | | | |
| 32 | 36.715 | 4.67 | 1.80810 | 22.8 | 1.2887 | 0.6596 |
| 33 | 243.948 | 4.05 | | | | |
| 34 | −118.468 | 1.40 | 1.81600 | 46.6 | 1.7383 | 0.7690 |
| 35 | 99.411 | 4.50 | | | | |
| 36 | 37.644 | 3.80 | 1.49700 | 81.5 | 2.0443 | 0.8258 |
| 37 | 210.238 | 3.92 | | | | |
| 38 | 75.769 | 1.20 | 1.67790 | 55.4 | 2.1192 | 0.8271 |
| 39 | 25.059 | 6.23 | | | | |
| 40 | −64.374 | 3.50 | 1.49700 | 81.5 | 2.0443 | 0.8258 |
| 41 | −25.982 | 6.00 | | | | |
| 42 | −34.155 | 1.20 | 1.67790 | 55.4 | 2.1192 | 0.8271 |
| 43 | −10405.572 | 7.31 | | | | |

-continued

| | | | | | | |
|---|---|---|---|---|---|---|
| 44 | 148.810 | 3.77 | 1.52841 | 76.5 | 1.9913 | 0.8175 |
| 45 | −51.580 | 1.20 | 1.64000 | 60.1 | 2.3803 | 0.8645 |
| 46 | 47.311 | 3.20 | | | | |
| 47 | 58.063 | 4.80 | 1.48749 | 70.2 | 2.5490 | 0.8924 |
| 48 | −23.263 | 1.20 | 1.65160 | 58.5 | 2.2947 | 0.8525 |
| 49 | −52.336 | 4.57 | | | | |
| 50 | 170.633 | 5.70 | 1.52841 | 76.5 | 1.9913 | 0.8175 |
| 51 | −20.435 | 1.20 | 1.64000 | 60.1 | 2.3803 | 0.8645 |
| 52 | −124.040 | 3.31 | | | | |
| 53 | 129.758 | 3.30 | 1.48749 | 70.2 | 2.5490 | 0.8924 |
| 54 | −43.345 | 10.00 | | | | |
| 55 | ∞ | 33.00 | 1.60859 | 46.4 | 1.8423 | 0.7750 |
| 56 | ∞ | 13.20 | 1.51680 | 64.2 | 2.3351 | 0.8687 |
| 57 | ∞ | 13.85 | | | | |
| Image plane | ∞ | | | | | |

Aspherical surface data

The thirteenth surface

K = 0.00000e+00 A 4 = 7.47758e−07 A 6 = 9.29456e−09 A 8 = 2.21240e−10
A10 = 1.75675e−12 A12 = 5.18281e−15 A14 = 3.78662e−18 A16 = 3.15661e−22
A 3 = 3.04852e−07 A 5 = −2.28681e−08 A 7 = −1.75909e−09 A 9 = −2.18764e−11
A11 = −1.10726e−13 A13 = −1.71256e−16 A15 = −5.08309e−20

The twenty-first surface

K = 0.00000e+00 A 4 = 2.26284e−07 A 6 = −1.92133e−11 A 8 = 8.65737e−14
A10 = −9.68992e−17 A12 = 2.63049e−20 A14 = 1.48323e−25 A16 = 5.54447e−27
A 3 = −1.41344e−07 A 5 = 8.13212e−10 A 7 = −1.39508e−12 A 9 = 3.33879e−16
A11 = 1.30310e−18 A13 = −3.70836e−22 A15 = −3.24743e−25

The twenty-eighth surface

K = 0.00000e+00 A 4 = 5.46711e−07 A 6 = 7.38787e−09 A 8 = 1.45148e−11
A10 = −1.16264e−14 A12 = 1.20199e−17 A14 = −2.51373e−20 A16 = −4.23103e−24
A 3 = 9.89211e−09 A 5 = −5.88461e−08 A 7 = −4.82342e−10 A 9 = 3.61333e−14
A11 = −5.51003e−17 A13 = 2.11899e−19 A15 = 5.65576e−22

Various data

Zoom ratio 92.00

| | Wide angle end | Middle | Telephoto end |
|---|---|---|---|
| Focal length | 15.00 | 154.80 | 1380.00 |
| F-number | 2.79 | 2.80 | 6.50 |
| Half angle of view | 20.14 | 2.03 | 0.23 |
| Total lens length | 663.26 | 663.26 | 663.26 |
| BF | 13.85 | 13.85 | 13.85 |
| d12 | 2.00 | 152.00 | 188.29 |
| d19 | 286.19 | 107.11 | 3.75 |
| d28 | 3.22 | 32.29 | 99.36 |
| Entrance pupil position | 164.15 | 1288.95 | 11895.41 |
| Exit pupil position | 490.72 | 490.72 | 490.72 |
| Front principal point position | 179.62 | 1493.98 | 17268.90 |
| Rear principal point position | −1.15 | −140.94 | −1366.15 |

Zoom lens unit data

| Unit | Leading surface | Focal length | Lens structure length | Front principal point position | Rear principal point position |
|---|---|---|---|---|---|
| 1 | 1 | 278.36 | 131.77 | 58.27 | −45.79 |
| 2 | 13 | −27.43 | 28.30 | 3.42 | −17.54 |
| 3 | 20 | 71.32 | 54.20 | 10.98 | −25.39 |
| 4 | 29 | 71.55 | 143.73 | 85.43 | 50.39 |

Single lens data

| Lens | Leading surface | Focal length |
|---|---|---|
| 1 | 1 | −1177.70 |
| 2 | 3 | 520.11 |
| 3 | 5 | −558.90 |
| 4 | 7 | 608.59 |
| 5 | 9 | 814.40 |
| 6 | 11 | 600.31 |
| 7 | 13 | −42.75 |

| | | |
|---|---|---|
| 8 | 15 | −48.74 |
| 9 | 16 | 54.04 |
| 10 | 18 | −99.91 |
| 11 | 20 | 136.20 |
| 12 | 22 | 196.75 |
| 13 | 24 | −101.07 |
| 14 | 25 | 100.06 |
| 15 | 27 | 369.39 |
| 16 | 30 | −58.15 |
| 17 | 32 | 52.41 |
| 18 | 34 | −65.71 |
| 19 | 36 | 91.32 |
| 20 | 38 | −55.53 |
| 21 | 40 | 84.83 |
| 22 | 42 | −50.33 |
| 23 | 44 | 72.74 |
| 24 | 45 | −38.22 |
| 25 | 47 | 34.63 |
| 26 | 48 | −65.07 |
| 27 | 50 | 34.79 |
| 28 | 51 | −38.25 |
| 29 | 53 | 66.84 |
| 30 | 55 | 0.00 |
| 31 | 56 | 0.00 |

TABLE 1

| | | Numerical Embodiment | | | | |
|---|---|---|---|---|---|---|
| Inequality | | 1 | 2 | 3 | 4 | 5 |
| (1) | ft/f1 | 3.65 | 4.63 | 4.01 | 4.52 | 4.96 |
| (2) | fw/Fnw | 4.88 | 10.73 | 5.23 | 5.14 | 5.36 |
| (3) | Ndn | 1.640 | 1.640 | 1.640 | 1.652 | 1.640 |
| (4) | θsn | 2.380 | 2.380 | 2.295 | 2.167 | 2.119 |
| (5) | θcn | 0.865 | 0.865 | 0.853 | 0.833 | 0.827 |
| (6) | vn | 60.08 | 60.08 | 58.54 | 55.53 | 55.35 |
| (7) | vp | 94.93 | 81.54 | 67.74 | 67.74 | 76.46 |
| (8) | θsp | 2.1017 | 2.0443 | 1.8476 | 1.8476 | 1.9913 |
| (9) | (θsn−θsp)/(vp−vn) | 5.30E−03 | 1.57E−02 | 1.57E−02 | 8.01E−03 | 2.87E−03 |
| (10) | (θsna−θspa)/(vpa−vna) | 1.01E−02 | 4.23E−05 | 6.10E−02 | 1.03E−02 | 1.37E−03 |
| (11) | fr/fn | −3.28 | −2.22 | −1.32 | −3.54 | −1.87 |
| (12) | kna | −1.53 | −1.89 | −1.08 | −1.68 | −1.51 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-107874, filed Jul. 4, 2022, which is hereby incorporated by reference herein in its entirety.

What is claimed is:

1. A zoom lens comprising in order from an object side to an image side:
    a first lens unit having a positive refractive power that does not move for zooming;
    a plurality of movable lens units including at least one lens unit having a negative refractive power; and
    a rear lens unit having a positive refractive power that does not move for zooming,
    wherein each interval between lens units adjacent to each other changes for zooming,
    wherein the following inequalities are satisfied, $$3.5 \leq ft/f1 \leq 6.0$$

$$4.7 \leq fw/Fnw \leq 12.0 \text{[mm]}$$

where fw represents a focal length of the zoom lens when focused on an infinity object at a wide angle end, ft represents a focal length of the zoom lens when focused on the infinity object at a telephoto end, f1 represents a focal length of the first lens unit, and Fnw represents an F number at a maximum aperture of the zoom lens at the wide angle end,
    wherein the rear lens unit includes a plurality of negative lenses including a negative lens A and a negative lens B, each of the negative lens A and the negative lens B the following inequalities, $$1.55 \leq Ndn \leq 1.75$$

$$2.10 \leq \theta sn \leq 2.60$$

where Ndn represents refractive indices with respect to d-line of materials of each of the negative lens A and the negative lens B and θsn represents first partial dispersion ratios of materials of each of the negative lens A and the negative lens B wherein the first partial dispersion ratios θsn are defined as follows, $$\theta sn = (NC - N1970)/(NF - NC)$$

where NC, NF, and N1970 represent refractive indices for the wavelengths of C-line, F-line, and 1970 nm, respectively.

2. The zoom lens according to claim 1, wherein the following inequality is satisfied, $$0.825 \leq \theta tn \leq 0.900$$

where θtn represents second partial dispersion ratios of material forming the negative lens A and the negative lens B, where the second partial dispersion ratios θtn are defined by the following equation, $$\theta tn = (NC - Nt)/(NF - NC)$$

where NC, NF, and Nt represent refractive indices for C-line, F-line, and t-line, respectively.

3. The zoom lens according to claim 1, wherein the following inequality is satisfied, $$50 \leq vn \leq 97$$

where vn represents Abbe numbers of the materials forming each of the negative lens A and the negative lens B.

4. The zoom lens according to claim 1,
wherein the rear lens unit includes a plurality of positive lenses, each of the plurality of positive lenses is disposed adjacent to any of the plurality of negative lenses and is formed of a material that satisfies the following inequality, $55 \le vp \le 120$ where vp represents an Abbe number of the material.

5. The zoom lens according to claim 4, wherein the following inequality is satisfied, $1.75 \le \theta sp \le 2.38$ where θsp represents third partial dispersion ratios of a material forming the plurality of positive lenses,
wherein the third partial dispersion ratios θsp are defined as follows, $\theta sp = (NC - N1970)/(NF - NC)$ where NC, NF, and N1970 represent refractive indices for the wavelengths of C-line, F-line, and 1970 nm, respectively.

6. The zoom lens according to claim 1,
wherein the rear lens unit includes a plurality of pairs of a negative lens included in the plurality of negative lenses and a positive lens disposed next to the negative lens,
wherein the following inequality is satisfied, $2.7 \times 10^{-3} \le (\theta sn - \theta sp)/(vp - vn)$ where vn represents an Abbe number of a material forming the plurality of negative lenses, vp represents an Abbe number of a material forming the plurality of positive lenses, and θsp represents third partial dispersion ratios of the material forming the plurality of positive lenses,
wherein the third partial dispersion ratios θsp are defined as follows, 74 $s = (NC - N1970)/(NF - NC)$ where NC, NF, and N1970 represent refractive indices for the wavelengths of C-line, F-line, and 1970 nm, respectively.

7. The zoom lens according to claim 5, wherein the following inequality is satisfied, $0 \le (\theta sna - \theta spa)/(vpa - vna) \le 6.1 \times 10^{-2}$ where vna represents an average value of Abbe numbers vn of materials forming all of negative lenses included in the rear lens unit, θsna represents an average value of first partial dispersion ratios of the materials forming all of the negative lenses included in the rear lens unit, vpa represents an average value of Abbe numbers vp of materials forming all of the positive lenses included in the rear lens unit, and θspa represents an average value of third partial dispersion ratios of the materials forming all of the positive lenses included in the rear lens unit.

8. The zoom lens according to claim 1, wherein the plurality of negative lenses includes a negative lens that satisfies the following inequality, $-8.0 \le fr/fn \le -1.2$ where fr represents a focal length of the rear lens unit and fn represents a focal length of the negative lens included in the plurality of negative lenses.

9. The zoom lens according to claim 1, wherein the following inequality is satisfied, $-6.0 \le kna \le -1.0$ where kna represents an average value of fr/fn for the plurality of the negative lenses, fr represents a focal length of the rear lens unit, fn represents a focal length of a negative lens included in the plurality of negative lenses.

10. An image pickup apparatus comprising:
a zoom lens comprising in order from an object side to an image side:
a first lens unit having a positive refractive power that does not move for zooming;
a plurality of movable lens units including at least one lens unit having a negative refractive power; and
a rear lens unit having a positive refractive power that does not move for zooming,
wherein each interval between lens units adjacent to each other changes for zooming,
wherein the following inequalities are satisfied, $3.5 \le ft/f1 \le 6.0$ $4.7 \le fw/Fnw \le 12.0 [\text{mmm}]$ where fw represents a focal length of the zoom lens when focused on an infinity object at the wide angle end, ft represents a focal length of the zoom lens when focused on the infinity object at the telephoto end, f1 represents a focal length of the first lens unit, and Fnw represents a F number at a maximum aperture of the zoom lens at the wide angle end,
wherein the rear lens unit includes a plurality of negative lenses including a negative lens A and a negative lens B, each of the negative lens A and the negative lens B satisfying the following inequalities, $1.55 \le Ndn \le 1.75$ $2.10 \le \theta sn \le 2.60$ where Ndn represents refractive indices with respect to d-line of materials of each of the negative lens A and the negative lens B and θsn represents first partial dispersion ratios of materials of each of the negative lens A and the negative lens B wherein the first partial dispersion ratios θsn are defined as follows, $\theta s = (NC - N1970)/(NF - NC)$ where NC, NF, and N1970 represent refractive indices for the wavelengths of C-line, F-line, and 1970 nm, respectively; and
the image pickup apparatus comprises an image pickup element that pickup an image formed by the zoom lens.

* * * * *